United States Patent
Bansal et al.

(10) Patent No.: US 10,530,451 B1
(45) Date of Patent: Jan. 7, 2020

(54) MODIFYING A MILLIMETER WAVE RADIO BASED ON A BEAM ALIGNMENT FEEDBACK

(71) Applicant: TOYOTA JIDOSHA KABUSHIKI KAISHA, Toyota-shi, Aichi-ken (JP)

(72) Inventors: Gaurav Bansal, Mountain View, CA (US); Takayuki Shimizu, Mountain View, CA (US)

(*) Notice: Subject to any disclaimer, the term of this patent is extended or adjusted under 35 U.S.C. 154(b) by 0 days.

(21) Appl. No.: 16/254,801

(22) Filed: Jan. 23, 2019

(51) Int. Cl.
| H04B 7/02 | (2018.01) |
| H04B 7/06 | (2006.01) |
| H04W 64/00 | (2009.01) |
| H04W 4/40 | (2018.01) |

(52) U.S. Cl.
CPC ........... *H04B 7/063* (2013.01); *H04B 7/0617* (2013.01); *H04W 4/40* (2018.02); *H04W 64/006* (2013.01)

(58) Field of Classification Search
CPC ....... H04B 7/063; H04B 7/0617; H04W 4/40; H04W 64/006
USPC ........................................................ 375/267
See application file for complete search history.

(56) References Cited

U.S. PATENT DOCUMENTS

| 2018/0332620 A1* | 11/2018 | Malladi | H04W 74/0816 |
| 2018/0376304 A1* | 12/2018 | Cheng | H04W 4/40 |
| 2019/0110178 A1* | 4/2019 | Baghel | H04W 4/40 |
| 2019/0222985 A1* | 7/2019 | Nguyen | H04L 12/1845 |

FOREIGN PATENT DOCUMENTS

JP    PO2004-072268    3/2004

* cited by examiner

*Primary Examiner* — Don N Vo
(74) *Attorney, Agent, or Firm* — Burbage Law, P.C.; Jon-Michael Burbage; Elizabeth Ruzich

(57) ABSTRACT

The disclosure includes embodiments for modifying a vehicle-to-everything (V2X) radio of a first endpoint based on beam alignment feedback data. In some embodiments, a method for the first endpoint includes detecting an intention of the first endpoint to exchange a first millimeter wave (mmWave) message with a second endpoint. The method includes determining scenario data describing a scenario of one or more of the first endpoint and the second endpoint. The method includes requesting a recommended beam alignment setting from a connected computing device based on the scenario data. The method includes receiving feedback data describing the recommended beam alignment setting from the connected computing device. The method includes modifying an operation of the V2X radio of the first endpoint based on the recommended beam alignment setting so that the V2X radio of the first endpoint exchanges the mmWave message with the second endpoint using the recommended beam alignment setting.

20 Claims, 10 Drawing Sheets

MODIFYING A MILLIMETER WAVE RADIO BASED ON A BEAM ALIGNMENT FEEDBACK

BACKGROUND

The specification relates to modifying a Vehicle-to-Everything (V2X) radio for Millimeter Wave (mmWave) communications based on beam alignment feedback data.

Radio waves in an Extremely High Frequency ("EHF") band (e.g., about 28 to 300 gigahertz ("GHz")) have wavelengths from ten to one millimeter and are consequently referred to as millimeter waves ("mmWave" or "mmWaves"). A challenge in mmWave communication includes beam alignment. The mmWave communication between two endpoints is not possible without first completing a beam alignment process between these two endpoints. For example, beamforming with narrow beams is needed to compensate high propagation loss at the mmWave band and appropriate beam pointing at both a receiver and a transmitter is needed. It is currently difficult or impossible to implement mmWave communication in vehicles because existing technologies cannot complete a beam alignment process in a timely fashion that is sufficiently quick for vehicular applications. For example, vehicles travel quickly on roadways, and if an endpoint for a mmWave communication is a vehicle (or worse yet, both endpoints for an mmWave communication are vehicles), then it is needed to execute a beam alignment process in a short amount of time.

An existing solution for beam alignment is known as "beam training by beam sweeping." This solution is not adequate for vehicle applications because it is designed for low mobility environments and does not work for high mobility environments such as present in vehicle applications.

SUMMARY

Described are embodiments of a modification system installed in an electronic control unit (ECU) of a first endpoint and a feedback system installed in a connected computing device such as a server (e.g., a cloud server). The modification system and the feedback system cooperate with one another to modify one or more of a V2X radio of the first endpoint and a V2X radio of a second endpoint so that a mmWave message can be exchanged between the first endpoint and the second endpoint.

In some embodiments, the feedback system collects data from various vehicles that are enabled with mmWave communication capabilities about which beam pair settings have been successful for them in different scenarios. The modification system of each of the various vehicles provides this information to the feedback system. The feedback system builds a database describing which beam pair settings work best in different scenarios. Later, after the database is built, the modification system of an ego vehicle can execute one or more of the following operations: (1) determining that a mmWave message is desired to be exchanged with a remote vehicle; (2) determining digital data describing a current scenario; (3) requesting a recommended beam alignment setting from the feedback system based on the current scenario; (4) receiving feedback data describing the recommended beam alignment setting based on the current scenario; (5) taking one or more actions to modify the mmWave radio settings of the ego vehicle (and, optionally, the mmWave radio settings of the remote vehicle as well) based on the feedback data provided by the feedback system describing the recommended beam alignment setting; and (6) exchanging the mmWave message with the remote vehicle using the recommended beam alignment setting.

Some existing solutions rely on beam training that does not work in vehicular applications because it takes too much time. By comparison to the existing solutions, the modification system described herein determines a beam alignment setting for a V2X radio of the ego vehicle based on feedback data received from a connected computing device such as a server (e.g., a cloud server) that maintains a database of optimal beam alignment settings in different real-world scenarios as experienced and reported by actual real-world vehicles. The modification system and the feedback system described herein are an improvement over the existing solutions because, for example, they allow beam alignment to occur in a time frame that permits mmWave communications to be consistently achievable by vehicles.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a first endpoint, including: detecting an intention of the first endpoint to exchange a first millimeter wave (mmWave) message with a second endpoint; determining first scenario data describing a first scenario of one or more of the first endpoint and the second endpoint; requesting a recommended beam alignment setting from a server based on the first scenario data; receiving feedback data describing the recommended beam alignment setting from the server; and modifying an operation of a V2X radio of the first endpoint based on the recommended beam alignment setting so that the V2X radio of the first endpoint exchanges the first mmWave message with the second endpoint using the recommended beam alignment setting. Other embodiments of this aspect include corresponding computer systems, apparatus, and computer programs recorded on one or more computer storage devices, each configured to perform the actions of the methods.

Implementations may include one or more of the following features. The method where requesting the recommended beam alignment setting from the server based on the first scenario data includes: sending a beam request message to the server, where the beam request message includes the first scenario data as payload data and includes a request for the recommended beam alignment setting that is optimized for the first scenario, and where the beam request message causes the server to query a beam alignment database that includes optimal beam alignment settings in different real-world scenarios based on the first scenario data and to generate feedback data describing the recommended beam alignment setting as a query result. The method where the first scenario data includes one or more of: location data describing a geographic location of the first endpoint; speed data describing a speed, an acceleration or a combination thereof of the first endpoint; time data describing a time when the first endpoint is present at the geographic location; weather data describing one or more weather conditions at the geographic location; relative data describing one or more of a location of the second endpoint relative to the first endpoint, a speed of the second endpoint relative to the first endpoint and an acceleration of the second endpoint relative to the first endpoint; and endpoint data describing one or more of a make and model of the second endpoint and a make and model of the first endpoint. The method where the recommended beam alignment setting provides an improved mmWave communication performance for the V2X radio of the first endpoint that includes a reduction of beam alignment overhead. The method further including: modifying an operation of a V2X radio of the second endpoint based on the recommended beam alignment setting to cause a beam of the V2X radio of the first endpoint to be aligned with a beam of the V2X radio of the second endpoint so that the first mmWave message is exchanged between the first endpoint and the second endpoint using the recommended beam alignment setting. The method where the recommended beam alignment setting includes a first recommended beam lobe for the first endpoint and a second recommended beam lobe for the second endpoint, and the V2X radio of the first endpoint and the V2X radio of the second endpoint are modified to use the first recommended beam lobe and the second recommended beam lobe respectively to exchange the first mmWave message. The method where prior to detecting the intention of the first endpoint to exchange the first mmWave message with the second endpoint, the method further includes: detecting an intention of the first endpoint to exchange a second mmWave message with a third endpoint; generating a beam report message related to exchanging of the second mmWave message; and sending the beam report message to the server so that the server uses the beam report message as an input to build a beam alignment database that includes optimal beam alignment settings in different real-world scenarios. The method where generating the beam report message related to exchanging of the second mmWave message includes: determining second scenario data describing a second scenario of one or more of the first endpoint and the third endpoint; causing the V2X radio of the first endpoint to record beam data describing one or more results of a beam alignment training with the third endpoint; and causing the V2X radio of the first endpoint to transmit the beam report message including the second scenario data and the beam data to the server via a V2X network. The method where the second scenario data includes one or more of: location data describing a geographic location of the first endpoint; speed data describing a speed, an acceleration or a combination thereof of the first endpoint; time data describing a time when the first endpoint is present at the geographic location; weather data describing one or more weather conditions at the geographic location; relative data describing one or more of a location of the third endpoint relative to the first endpoint, a speed of the third endpoint relative to the first endpoint and an acceleration of the third endpoint relative to the first endpoint; and endpoint data describing one or more of a make and model of the third endpoint and a make and model of the first endpoint. The method where the beam data includes one or more of: a list of candidate beam pairs being trained; a received signal strength for each candidate beam pair being trained; and a data rate achieved by each candidate beam pair. The method where the third endpoint is identical to the second endpoint. The method where the third endpoint is different from the second endpoint. The method where the first endpoint is an ego vehicle and the second endpoint is a remote vehicle. Implementations of the described techniques may include hardware, a method or process, or computer software on a computer-accessible medium.

One general aspect includes a system including an onboard vehicle computer system of a first endpoint including a non-transitory memory storing computer code which, when executed by the onboard vehicle computer system, causes the onboard vehicle computer system to: detect an intention of the first endpoint to exchange a first millimeter wave (mmWave) message with a second endpoint; determine first scenario data describing a first scenario of one or more of the first endpoint and the second endpoint; request a recommended beam alignment setting from a server based on the first scenario data; receive feedback data describing the recommended beam alignment setting from the server; and modify an operation of a V2X radio of the first endpoint based on the recommended beam alignment setting so that the V2X radio of the first endpoint exchanges the first mmWave message with the second endpoint using the recommended beam alignment setting. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard vehicle computer system, causes the onboard vehicle computer system to request the recommended beam alignment setting from the server based on the first scenario data at least by: sending a beam request message to the server, where the beam request message includes the first scenario data as payload data and includes a request for the recommended beam alignment setting that is optimized for the first scenario, and where the beam request message causes the server to query a beam alignment database that includes optimal beam alignment settings in different real-world scenarios based on the first scenario data and to generate feedback data describing the recommended beam alignment setting as a query result. The system where the computer code, when executed by the onboard vehicle computer system, causes the onboard vehicle computer system further to: modify an operation of a V2X radio of the second endpoint based on the recommended beam alignment setting to cause a beam of the V2X radio of the first endpoint to be aligned with a beam of the V2X radio of the second endpoint so that the first mmWave message is exchanged between the first endpoint and the second endpoint using the recommended beam alignment setting. The system where prior to detecting the intention of the first endpoint to exchange the first mmWave message with the second endpoint, the computer code, when executed by the onboard vehicle computer system, causes the onboard vehicle computer system to: detect an intention of the first endpoint to exchange a second mmWave message with a third endpoint; generate a beam report message related to exchanging of the second mmWave message; and send the beam report message to the server so that the server uses the beam report message as an input to build a beam alignment database that includes optimal beam alignment settings in different real-world scenarios. Implementations of the described techniques may include hardware, a method or process, or computer software on a computer-accessible medium.

One general aspect includes a computer program product including a non-transitory memory of an onboard vehicle computer system of a first endpoint storing computer-executable code that, when executed by a processor, causes the processor to: detect an intention of the first endpoint to exchange a first millimeter wave (mmWave) message with a second endpoint; determine first scenario data describing a first scenario of one or more of the first endpoint and the second endpoint; request a recommended beam alignment setting from a server based on the first scenario data; receive feedback data describing the recommended beam alignment setting from the server; and modify an operation of a V2X radio of the first endpoint based on the recommended beam alignment setting so that the V2X radio of the first endpoint exchanges the first mmWave message with the second endpoint using the recommended beam alignment setting. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor further to: modify an operation of a V2X radio of the second endpoint based on the recommended beam alignment setting to cause a beam of the V2X radio of the first endpoint to be aligned with a beam of the V2X radio of the second endpoint so that the first mmWave message is exchanged between the first endpoint and the second endpoint using the recommended beam alignment setting. The computer program product where prior to detecting the intention of the first endpoint to exchange the first mmWave message with the second endpoint, the computer-executable code, when executed by the processor, causes the processor further to: detect an intention of the first endpoint to exchange a second mmWave message with a third endpoint; generate a beam report message related to exchanging of the second mmWave message; and send the beam report message to the server so that the server uses the beam report message as an input to build a beam alignment database that includes optimal beam alignment settings in different real-world scenarios. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
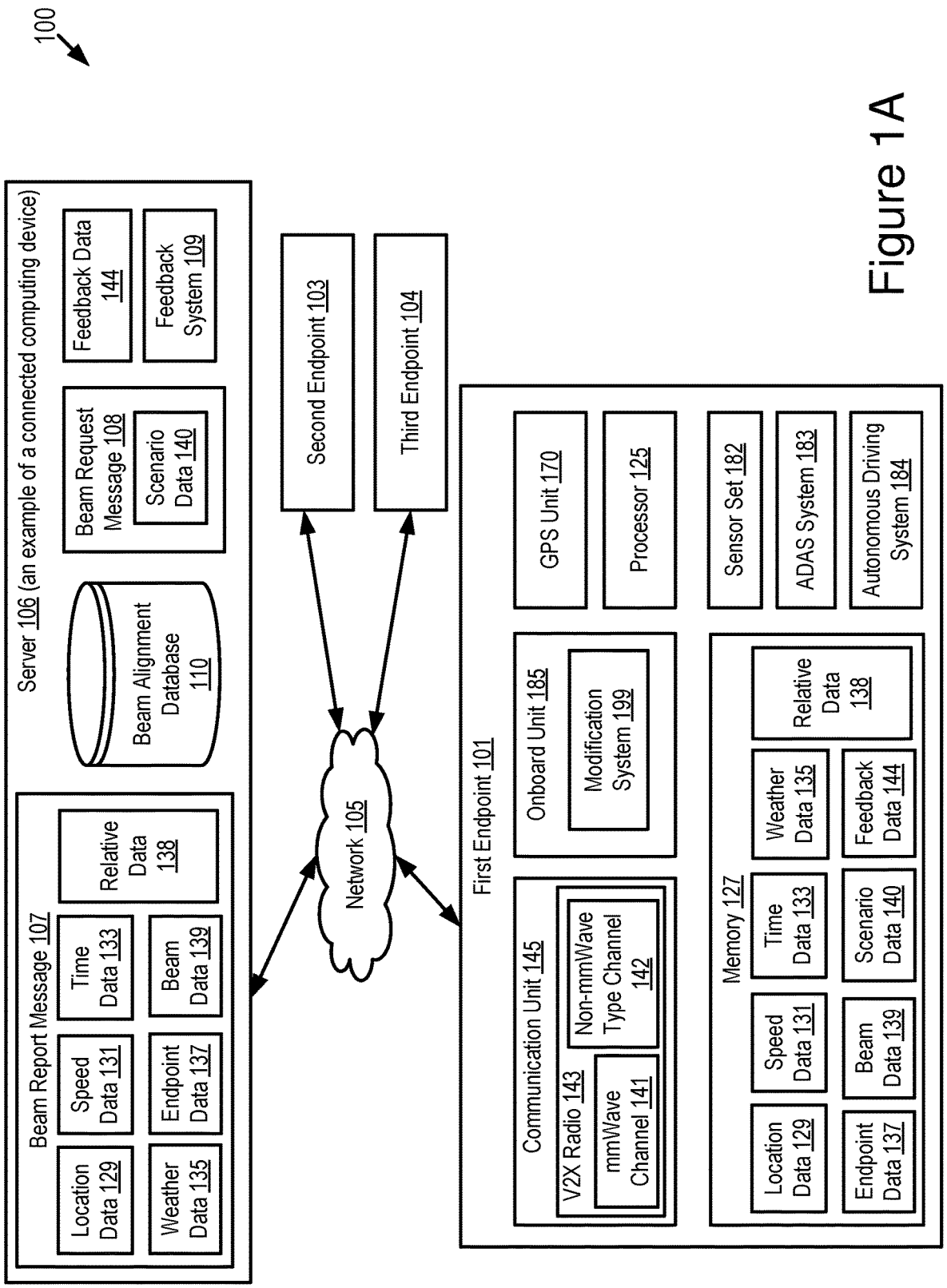
FIG. 1A is a block diagram illustrating an operating environment for a modification system and a feedback system according to some embodiments.

Deploying mmWave communication has become cheaper recently due to advancements in Complementary metal-oxide-semiconductor (CMOS) technology. Deploying mmWave communication in vehicles is desirable because future vehicles may require data rates with a magnitude of gigabits per second (Gbps) and mmWave communication is capable of providing Gbps data rates over short ranges.

Application of mmWave communication is beneficial since the mmWave communication enables communication devices to send and receive large amounts of data (e.g., 0 to 1000 gigabytes) in an amount of time that is acceptable to users or within some predetermined safety standard. The mmWave communication has a great potential for massive consumer applications (e.g., IEEE802.11 ad/WiGig for high-speed and short-range communication; 5G cellular communications; automated driving applications, etc.). The automated driving applications include, but are not limited to: (1) sharing local sensor information recorded by sensors such as a LIDAR, radar, camera, etc., with connected vehicles and infrastructure devices to expand sensor coverage and obtain non-line-of-sight (NLOS) view so as to achieve a safer, efficient and proactive driving; (2) uploading local sensor information to a cloud server via infrastructures for high-definition (HD) 3D map generation at the cloud server so that a global HD 3D map can be kept updated; and (3) downloading a HD 3D map for automated driving from infrastructures on demand when a vehicle enters a new city so that there is no need to store all 3D map data of an entire country in the vehicle's storage and it is easy to keep the 3D map data updated. Transmission and reception of HD 3D maps and vehicle sensor information has many applications. One application that may benefit from the ability to transmit and receive HD 3D maps and vehicle sensor information is automated vehicles, drones, and robots.

For example, mmWave communication may be used to communicate with (1) roadside equipment or (2) other vehicles. Because of the wide bandwidth available, mmWave communication may be particularly beneficial for transmitting and receiving large data sets. Example data that may be transmitted and received via mmWave communication include, among other things, (1) high definition 3D maps and (2) vehicle sensor information. This information may not be reasonable to be transmitted via conventional means (e.g., 3G, 4G, WiFi, Dedicated Short Range Communication (DSRC)) because transmission of the large amount of data via conventional means may either not be reasonably possible or may result in poor performance of the vehicle equipment. However, transmission of this information via mmWave communication can be routinely achieved and may not result in poor performance of our vehicle equipment.

Existing solutions such as "beam training by beam sweeping" are not suitable for vehicle applications because it is designed for low mobility environments. Vehicle applications frequently include high mobility environments. Thus, embodiments of a modification system and a feedback system are described herein that are capable of modifying one or more of a V2X radio of a first endpoint and a V2X radio of a second endpoint based on beam alignment feedback data so that a mmWave message can be exchanged between the first endpoint and the second endpoint. The modification system and the feedback system are described in more detail below.

In some embodiments, a vehicle that includes the modification system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

DSRC has a range of substantially 500 meters and is designed to be compatible for wirelessly sending and receiving messages among mobile nodes such as vehicles and Roadside Units ("RSU" if singular, "RSUs" if plural).

In some embodiments, devices other than vehicles (e.g., an endpoint that is not a vehicle) may be DSRC-equipped. These DSRC-equipped devices may be used to relay wireless vehicle data to the vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communications to transmit and receive wireless messages. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mm-Wave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM.

In some embodiments, DSRC-equipped vehicles may probe other DSRC-equipped vehicles/devices along the roadway for information describing their current and future conditions, including their path history, future path, and sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices or endpoints). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Referring to FIG. 1A, depicted is an operating environment 100 for a modification system 199 according to some embodiments. The operating environment 100 may include one or more of the following elements: a first endpoint 101; a second endpoint 103; a third endpoint 104; and a server 106. These elements of the operating environment 100 may be communicatively coupled to a network 105. Although not depicted in FIG. 1A, the operation environment 100 may include one or more RSUs that are DSRC-enabled. The one or more DSRC-enabled RSUs may relay wireless messages among the first endpoint 101, the second endpoint 103, the third endpoint 104 and the server 106 via the network 105. For example, the range of DSRC transmissions is generally about 500 meters, and so, if the second endpoint 103 is 700 meters away from the first endpoint 101, then one or more intervening DSRC-enabled RSUs may relay a DSRC message from the second endpoint 103 to the first endpoint 101 or from the first endpoint 101 to the second endpoint 103.

Although three endpoints and one network 105 are depicted in FIG. 1A, in practice the operating environment 100 may include any number of endpoints and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X wireless messages among various endpoints (e.g., vehicles, roadside equipment, etc.) that each include a V2X radio. Each of the channels of the V2X radio may transmit and receive different types of V2X messages. For example, V2X channel #1 may transmit and receive mmWave messages, whereas V2X channel #2 may transmit and receive non-mmWave type V2X messages, such as one of the following: DSRC; LTE-V2X; 5G-V2X; ITS-G5 in Europe; ITS-Connect; or some other type of V2X communication that does not include mmWave. In some embodiments, each endpoint may include multiple V2X radios, including a first V2X radio (e.g., a non-mmWave radio) used for transmitting and receiving non-mmWave messages and a second V2X radio (e.g., a mmWave radio) used for transmitting and receiving mmWave messages.

Different non-mmWave types of V2X communication can be used in different countries. For example, if the modification system is implemented in the United States, then DSRC may be ideal for use as the non-mmWave type of V2X communication. If the modification system is implemented in Japan, then ITS-Connect may be ideal for use as the non-mmWave type of V2X communication. If the modification system is implemented in China, then LTE-V2X may be ideal for use as the non-mmWave type of V2X communication.

The first endpoint 101, the second endpoint 103 and the third endpoint 104 can be any communication devices in a roadway environment. For example, each of the first endpoint 101, the second endpoint 103 and the third endpoint 104 can be a vehicle (e.g., a connected vehicle with a communication unit described below), a roadside unit, a base station, or any other infrastructure device. The first endpoint 101, the second endpoint 103 and the third endpoint 104 may have a similar structure and provide similar functionality, and the description provided below for the first endpoint 101 may also be applicable to the second endpoint 103 and the third endpoint 104.

The first endpoint 101 may include one or more of the following elements: a processor 125; a memory 127; a communication unit 145; a GPS unit 170; a sensor set 182; an Advanced Driver-Assistance System (ADAS system) 183; an autonomous driving system 184; an onboard unit 185; and the modification system 199. These elements of the first endpoint 101 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the modification system 199. The onboard vehicle computer system may be operable to access and execute the data stored on the memory 127 to provide the functionality described herein for the modification system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first endpoint 101 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The first endpoint 101 may include one or more memories 127.

The memory 127 of the first endpoint 101 may store one or more of the following elements: location data 129; speed data 131; time data 133; weather data 135; endpoint data 137; relative data 138; beam data 139; scenario data 140; and feedback data 144.

The location data 129 includes digital data that describes a geographic location of the first endpoint 101 as determined by one or more onboard sensors of the first endpoint 101. For example, the location data 129 includes GPS data describing the geographic location of the first endpoint 101 with a lane-level accuracy, e.g., an accuracy of plus or minus 3 meters as required by the DSRC standard.

The speed data 131 includes digital data describing a speed, an acceleration, or a combination thereof of the first endpoint 101.

The time data 133 includes digital data describing a time when the first endpoint 101 is present at the geographic location described by the location data 129. For example, the time data 133 describes a time of day and a day of week when the first endpoint 101 is present at the geographic location described by the location data 129.

The weather data 135 includes digital data describing one or more weather conditions at the geographic location described by the location data 129. Example weather conditions include, but are not limited to, windy, rainy, sunny, icy, foggy, cloudy, etc.

The endpoint data 137 includes digital data describing one or more of the first endpoint 101, the second endpoint 103 and the third endpoint 104. For example, the first endpoint 101, the second endpoint 103 and the third endpoint 104 are vehicles, and the endpoint data 137 is vehicle data that describes one or more of a make and model of the first endpoint 101, a make and model of the second endpoint 103, and a make and model of the third endpoint 104.

The relative data 138 includes digital data describing a parameter of another endpoint relative to the first endpoint 101. For example, the relative data 138 includes digital data describing one or more of a location of the second endpoint 103 relative to the first endpoint 101, a speed of the second endpoint 103 relative to the first endpoint 101 and an acceleration of the second endpoint 103 relative to the first endpoint 101. In another example, the relative data 138 includes digital data describing one or more of a location of the third endpoint 104 relative to the first endpoint 101, a speed of the third endpoint 104 relative to the first endpoint 101 and an acceleration of the third endpoint 104 relative to the first endpoint 101.

The beam data 139 includes digital data describing one or more results of a beam alignment training between the first endpoint 101 and another endpoint. For example, the beam data 139 includes one or more of: a list of candidate beam pairs being trained between the first endpoint 101 and another endpoint (e.g., the second endpoint 103 or the third endpoint 104); a received signal strength for each candidate beam pair being trained; and a data rate achieved by each candidate beam pair.

The scenario data 140 includes digital data describing a scenario of one or more of the first endpoint 101 and another endpoint. In some embodiments, the scenario data 140 includes one or more of: the location data 129; the speed data 131; the time data 133; the weather data 135; the relative data 138; and the endpoint data 137.

The feedback data 144 includes digital data describing a recommended beam alignment setting that is determined by the server 106 based on the scenario data 140. The feedback data 144 is described below in more detail.

The communication unit 145 transmits and receives data to and from the network 105 or to another communication channel. In some embodiments, the communication unit 145 may include a DSRC transceiver, a DSRC receiver and other hardware or software necessary to make the first endpoint 101 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

The V2X radio 143 includes multiple channels including an mmWave channel 141 and a non-mmWave type channel 142. The mmWave channel 141 is used for performing mmWave communications. The non-mmWave type channel 142 is used for performing non-mmWave type communications (e.g., DSRC communications or any other type of V2X communications that does not include mmWave).

In some embodiments, the communication unit 145 may include multiple V2X radios 143, including a first V2X radio (e.g., a non-mmWave radio) used for transmitting and receiving non-mmWave messages and a second V2X radio (e.g., a mmWave radio) used for transmitting and receiving mmWave messages.

In some embodiments, the GPS unit 170 is a conventional GPS unit of the first endpoint 101. For example, the GPS unit 170 may include hardware that wirelessly communicates with a GPS satellite to retrieve data that describes a geographic location of the first endpoint 101. For example, the GPS unit 170 retrieves GPS data describing the geographic location of the first endpoint 101 from one or more GPS satellites. In some embodiments, the GPS unit 170 is a DSRC-compliant GPS unit of the first endpoint 101 that is operable to provide GPS data describing the geographic location of the first endpoint 101 with lane-level accuracy.

The sensor set 182 includes one or more sensors that are operable to measure a roadway environment outside of the first endpoint 101. For example, the sensor set 182 may include one or more sensors that record one or more physical characteristics of the roadway environment that is proximate to the first endpoint 101. The memory 127 may store sensor data that describes the one or more physical characteristics recorded by the sensor set 182. The roadway environment outside of the first endpoint 101 may include the second endpoint 103 and the third endpoint 104, and so, one or more of the sensors of the sensor set 182 may record sensor data that describes information about the second endpoint 103 and the third endpoint 104.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The onboard unit 185 may be a computing device onboard on the first endpoint 101. For example, the onboard unit 185 includes an ECU. The ECU is an embedded system in automotive electronics that controls one or more of electrical systems or subsystems in the first endpoint 101. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the first endpoint 101 may include multiple onboard units 185 (e.g., multiple ECUs). In some embodiments, the modification system 199 may be an element of the onboard unit 185.

In some embodiments, the ADAS system 183 is a conventional ADAS system that controls operation of the first endpoint 101. In some embodiments, the ADAS system 183 may also include any software or hardware included in the first endpoint 101 that makes the first endpoint 101 an autonomous vehicle or a semi-autonomous vehicle.

Examples of the ADAS system 183 may include one or more of the following elements of the first endpoint 101: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the autonomous driving system 184 may include any software or hardware included in the first endpoint 101 that makes the first endpoint 101 an autonomous vehicle. In some embodiments, the first endpoint 101 includes either the autonomous driving system 184 or the ADAS system 183. In some other embodiments, the first endpoint 101 includes both the autonomous driving system 184 and the ADAS system 183.

In some embodiments, the modification system 199 includes software that is operable, when executed by the processor 125, to cause the processor 125 to execute one or more steps of example processes 193, 500 and 550 and methods 300, 400 and 450 described below with reference to FIGS. 1D and 3-5B.

In some embodiments, the modification system 199 may be implemented using hardware including a field-programmable gate array ("FPGA") or an application-specific integrated circuit ("ASIC"). In some other embodiments, the modification system 199 may be implemented using a combination of hardware and software. The modification system 199 may be stored in a combination of the devices (e.g., servers or other devices), or in one of the devices.

The modification system 199 is described in more detail below with reference to FIGS. 1C-5B.

The server 106 can be a computing device that includes a processor and a memory. For example, the server 106 is a cloud server. The server 106 may include the feedback system 109 and a beam alignment database 110. In some embodiments, the server 106 includes a communication unit such as the communication unit 145 depicted as an element of the first endpoint 101.

In some embodiments, the server 106 is an example of a connected computing device that includes the feedback system 109 and the beam alignment database 110. Accordingly, all references herein to "a server," "the server," or "the server 106" with reference to the functionality provided by the feedback system 109 and the beam alignment database 110 may be replaced by "a connected computing device," "the connected computing device," or similar terminology. A connected computing device is a processor-based computing device that includes the feedback system 109, the beam alignment database 110, and a communication unit. The communication unit provides functionality similar to the communication unit 145, and so, that description will not be repeated here.

In some embodiments, the server 106 may store various beam report messages 107 received from various endpoints. Each beam report message 107 received from a particular endpoint may include one or more of the following: the location data 129 of the particular endpoint; the speed data 131 of the particular endpoint; the time data 133 of the particular endpoint; the weather data 135 of the particular endpoint; the relative data 138 of the particular endpoint; the endpoint data 137 of the particular endpoint; and the beam data 139 of the particular endpoint.

In some embodiments, the feedback system 109 includes software that is operable, when executed by a processor of the server 106, to cause the processor to execute one or more steps of example processes 191, 193, 500 and 550 described below with reference to Figures IC-1D and 5A-5B.

In some embodiments, the feedback system 109 may be implemented using hardware including a field-programmable gate array ("FPGA") or an application-specific integrated circuit ("ASIC"). In some other embodiments, the feedback system 109 may be implemented using a combination of hardware and software. The feedback system 109 may be stored in a combination of the devices (e.g., servers or other devices), or in one of the devices.

In some embodiments, the feedback system 109 aggregates the beam report messages received from various endpoints and builds the beam alignment database 110 based on the beam report messages. The beam alignment database 110 may include a database of optimal beam alignment settings in different real-world scenarios. For example, the beam alignment database 110 is a data structure that organizes digital data describing which beam pair settings work best in different scenarios.

In some embodiments, the feedback system 109 may receive a beam request message 108 from an endpoint (e.g., the first endpoint 101). The beam request message 108 includes the scenario data 140. The feedback system 109 may apply the beam alignment database 110 to determine a recommended beam alignment setting for the endpoint based on the scenario data 140. The feedback system 109 generates the feedback data 144 describing the recommended beam alignment setting and sends the feedback data 144 to the endpoint so that the endpoint can perform a mmWave communication using the recommended beam alignment setting.

The feedback system 109 is described in more detail below with reference to Figures IC-1D and 5A-5B.

Figure 1B:
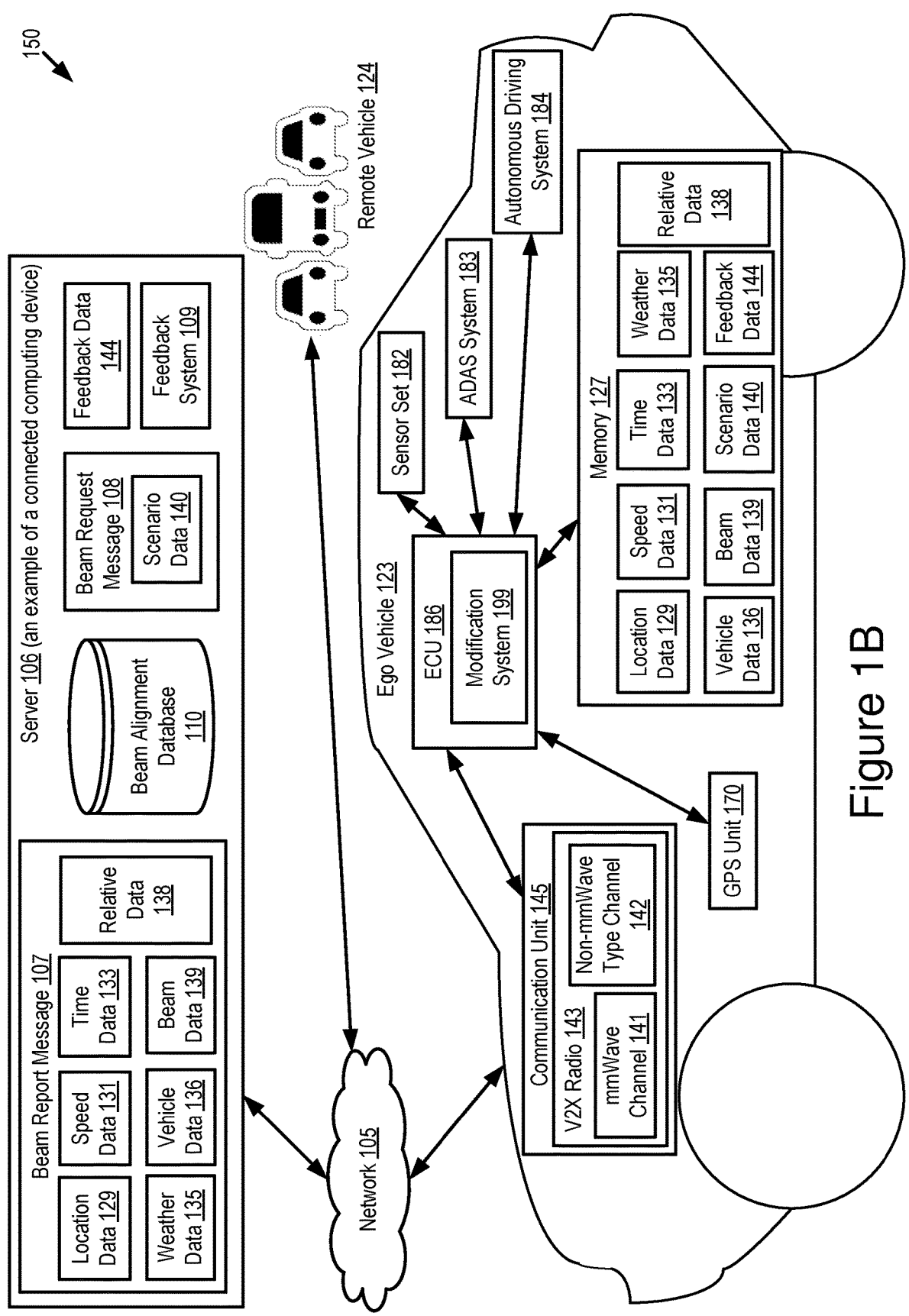
FIG. 1B is another block diagram illustrating an operating environment for a modification system and a feedback system according to some embodiments.

Referring to FIG. 1B, depicted is another operating environment 150 for the modification system 199 and the feedback system 109 according to some embodiments. The operating environment 150 may include one or more of the following elements: the server 106; an ego vehicle 123; and one or more remote vehicles 124. These elements of the operating environment 150 may be communicatively coupled to the network 105.

Although one ego vehicle 123, three remote vehicles 124, one server 106 and one network 105 are depicted in FIG. 1B, in practice the operating environment 150 may include one or more ego vehicles 123, one or more remote vehicles 124, one or more servers 106 and one or more networks 105.

In some embodiments, the ego vehicle 123 may be an example of the first endpoint 101 and a remote vehicle 124 may be an example of the second endpoint 103 or the third endpoint 104. Thus, description provided herein for the first endpoint 101, the second endpoint 103 and the third endpoint 104 may also be applicable to the ego vehicle 123 and the remote vehicle 124. Similar description is not repeated here.

In some embodiments, the ego vehicle 123 and the remote vehicle 124 may have a similar structure, and the description provided below for the ego vehicle 123 may also be applicable to the remote vehicle 124.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the modification system 199.

In some embodiments, one or more of the ego vehicle 123 and the remote vehicle 124 may be DSRC-equipped devices. The network 105 may include one or more communication channels shared among the ego vehicle 123, the remote vehicle 124 and one or more RSUs. The one or more communication channels may include DSRC, LTE-V2X, 5G-V2X, full-duplex wireless communication or any other wireless communication protocol. For example, the network 105 may be used to transmit a DSRC message, DSRC probe or BSM including any of the data described herein.

The ego vehicle 123 may be any type of vehicle. For example, the ego vehicle 123 may include one of the following types of vehicles: a car; a truck; a sports utility vehicle; a bus; a semi-truck; a drone or any other roadway-based conveyance.

In some embodiments, the ego vehicle 123 may include an autonomous vehicle or a semi-autonomous vehicle. For example, the ego vehicle 123 may include an Advanced Driver-Assistance System (e.g., the ADAS system 183). The ADAS system 183 may provide some or all of the functionality that provides autonomous functionality.

The ego vehicle 123 may include one or more of the following elements: the processor 125; the memory 127; the communication unit 145; the GPS unit 170; the sensor set 182; an ECU 186; the ADAS system 183; the autonomous driving system 184; and the modification system 199. These elements of the ego vehicle 123 may be communicatively coupled to one another via a bus. These elements of the ego vehicle 123 are described above with reference to FIG. 1A, and similar description is not repeated here.

In some embodiments, the memory 127 of the ego vehicle 123 stores one or more of: the location data 129; the speed data 131; the time data 133; the weather data 135; vehicle data 136; the relative data 138; the beam data 139; the scenario data 140; and the feedback data 144.

The location data 129 includes, for example, digital data that describes a geographic location of the ego vehicle 123 as determined by one or more onboard sensors of the ego vehicle 123. For example, the location data 129 includes GPS data describing the geographic location of the ego vehicle 123 with a lane-level accuracy, e.g., an accuracy of plus or minus 3 meters as required by the DSRC standard.

The speed data 131 includes, for example, digital data describing a value for a speed of the ego vehicle 123 (e.g., how fast the ego vehicle 123 is driving, i.e., "a speed" of the ego vehicle 123), a value for how fast the ego vehicle is accelerating (e.g., how quickly the ego vehicle 123 is accelerating, i.e., "an acceleration" of the ego vehicle 123), or a combination thereof for the ego vehicle 123.

The time data 133 includes digital data describing a time when the ego vehicle 123 is present at the geographic location described by the location data 129. For example, the time data 133 describes a time of day and a day of week when the ego vehicle 123 is present at the geographic location described by the location data 129.

The vehicle data 136 includes digital data that describes one or more of a make and model of the ego vehicle 123, as well as a make and model of the remote vehicle 124 if applicable.

The relative data 138 includes digital data describing a parameter of the remote vehicle 124 relative to the ego vehicle 123. For example, the relative data 138 includes digital data describing one or more of a location of the remote vehicle 124 relative to the ego vehicle 123, a speed of the remote vehicle 124 relative to the ego vehicle 123 and an acceleration of the remote vehicle 124 relative to the ego vehicle 123.

The beam data 139 includes digital data describing one or more results of a beam alignment training performed by the ego vehicle 123 with the remote vehicle 124. For example, the beam data 139 includes one or more of: a list of candidate beam pairs being trained between the ego vehicle 123 and the remote vehicle 124; a received signal strength for each candidate beam pair being trained; and a data rate achieved by each candidate beam pair.

The scenario data 140 includes digital data describing, for example, a driving scenario of one or more of the ego vehicle 123 and the remote vehicle 124. In some embodiments, the scenario data 140 includes one or more of: the location data 129; the speed data 131; the time data 133; the weather data 135; the relative data 138; and the vehicle data 136.

The feedback data 144 includes digital data describing a recommended beam alignment setting that is determined by the server 106 for one or more of the ego vehicle 123 and the remote vehicle 124 based on the scenario data 140.

Figure 1C:
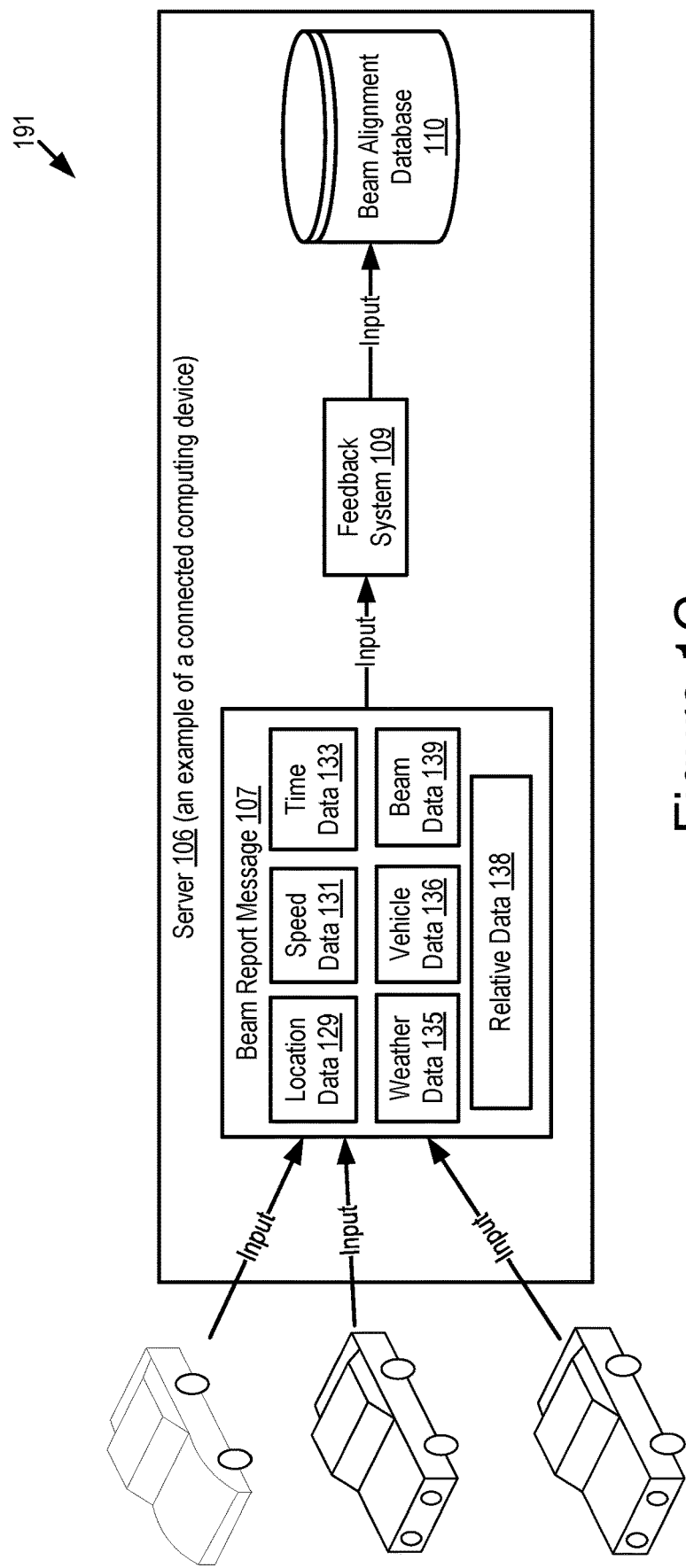
FIG. 1C depicts an example process executed by a modification system and a feedback system for building a beam alignment database according to some embodiments.

Referring to FIG. 1C, an example process 191 executed by the modification system 199 and the feedback system 109 for building the beam alignment database 110 is depicted according to some embodiments. In FIG. 1C, various connected vehicles are depicted to communicate with the server 106 via a V2X network to construct the beam alignment database 110 on the server 106. In some embodiments, the various connected vehicles are ego vehicles 123. Alternatively, the various connected vehicles include the ego vehicle 123, the remote vehicle 124 and any other vehicles.

In some embodiments, each of the various vehicles has a mmWave V2X radio and another radio with access to the server 106 (e.g., LTE-V2X, 5G-V2X, etc.) which is used to upload and download data to and from the server 106.

In some embodiments, the feedback system 109 of the server 106 collects data from the various connected vehicles enabled with mmWave communication capabilities about which beam pair settings have been successful for them in different scenarios; and the modification system 199 of each of the various connected vehicles provides this information to the feedback system 109. Then, the feedback system 109 builds the beam alignment database 110 which includes, for example, a database describing which beam pair settings work best in different scenarios.

For example, assume that the various connected vehicles in FIG. 1C are ego vehicles 123. Each of the ego vehicles 123 includes an instance of the modification system 199 installed in the vehicle. The modification system 199 of an ego vehicle 123 and the feedback system 109 of the server 106 cooperate with one another to execute one or more of the following operations at different times in order to construct the beam alignment database 110:

Operation (1): The modification system 199 of the ego vehicle 123 determines that one or more of the onboard components of the ego vehicle 123 desire to exchange a mmWave communication with a remote vehicle 124. For example, the ADAS system 183 or the autonomous driving system 184 of the ego vehicle 123 provides a command to the onboard communication unit 145 of the ego vehicle 123 to transmit a mmWave message to the remote vehicle 124.

Operation (2): The modification system 199 causes the onboard sensors of the ego vehicle 123 to record digital data describing a driving scenario. This digital data can be referred to as scenario data and includes one or more of the following: (a) location data 129 that describes a geographic location of the ego vehicle 123 (perhaps with lane-level accuracy, i.e., an accuracy of plus or minus 3 meters as required by the DSRC standard); (b) speed data 131 describing a speed, an acceleration or a combination thereof of the ego vehicle 123; (c) time data 133 describing a time when the ego vehicle 123 is present at the geographic location described by the location data; (d) weather data 135 describing one or more weather conditions at the geographic location; (e) relative data 138 describing information of the remote vehicle 124 relative to the ego vehicle 123 such as a location of the remote vehicle 124 relative to the ego vehicle 123, a speed of the remote vehicle 124 relative to the ego vehicle 123, an acceleration of the remote vehicle 124 relative to the ego vehicle 123; and (f) vehicle data 136 describing information about the ego vehicle 123 and the remote vehicle 124 such as a make and model of the ego vehicle 123 and the remote vehicle 124 (if known).

Operation (3): The modification system 199 causes the V2X radio 143 of the ego vehicle 123 to record beam data 139 describing one or more results of a beam alignment training with the remote vehicle 124. The beam data 139 is digital data describing, for example, a list of candidate mmWave beam pairs trained, a received signal strength (RSS) for each of the candidate mmWave beam pairs trained and a data rate achieved for each of the candidate mmWave beam pairs trained.

Operation (4): The modification system 199 causes the communication unit 145 of the ego vehicle 123 to transmit a beam report message 107 to the feedback system 109 via a wireless network (e.g., 3G, 4G, 5G, LTE, etc.). For example, the beam report message is an electronic wireless message that includes one or more of the following types of digital data as its payload: the beam data 139; the location data 129; the speed data 131; the time data 133; the weather data 135; the relative data 138; and the vehicle data 136.

Operation (5): The feedback system 109 receives various beam report messages 107 from various ego vehicles 123 and uses these beam report messages as inputs to construct the beam alignment database 110. The beam alignment database 110 is, for example, a data structure that organizes digital data describing which beam pair settings work best in different scenarios.

Figure 1D:
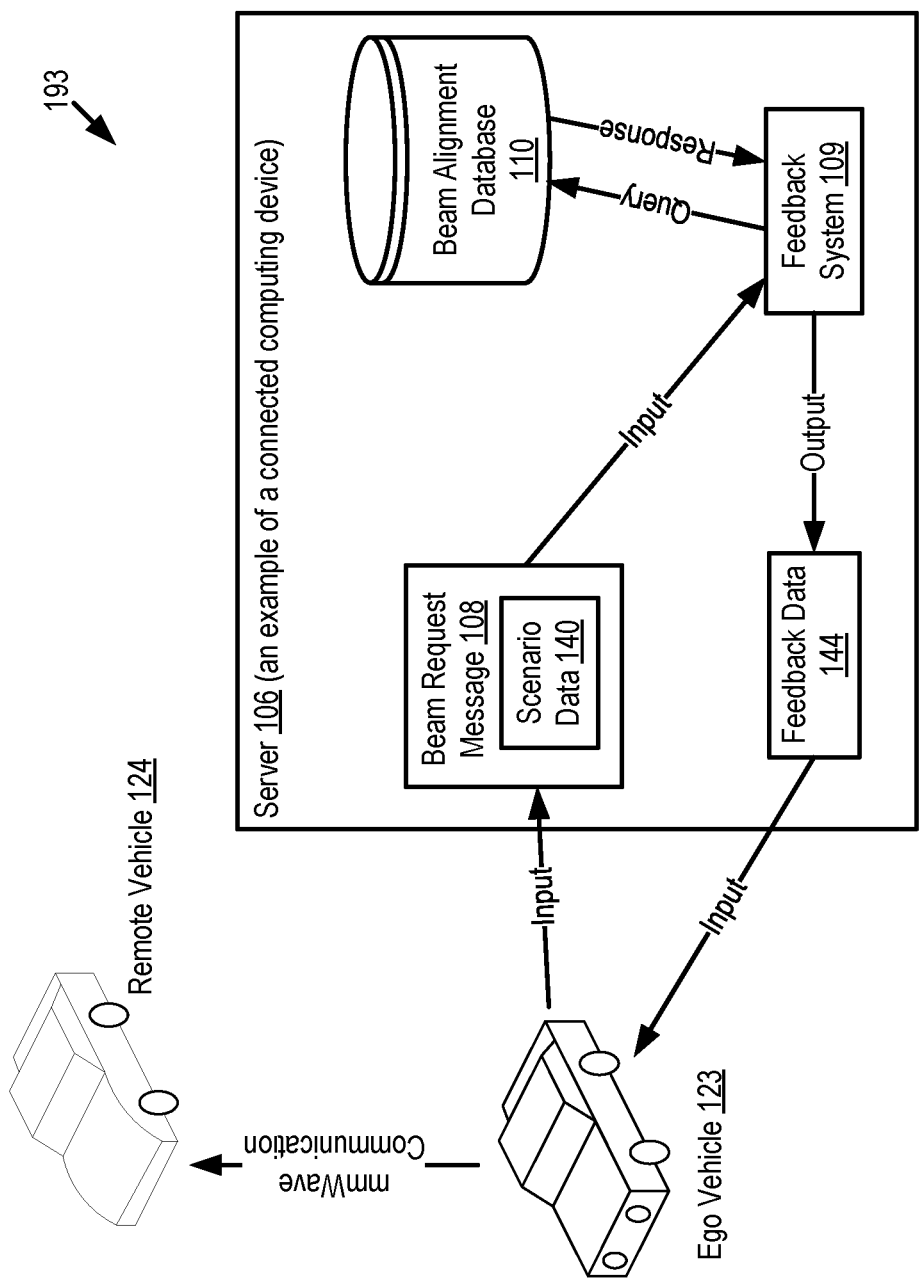
FIG. 1D depicts an example process executed by a modification system and a feedback system for mmWave communications according to some embodiments.

FIG. 1D depicts an example process 193 executed by the modification system 199 and the feedback system 109 for mmWave communications according to some embodiments. The process 193 shows an example approach to use the beam alignment database 110 in a feedback loop. In some embodiments, after the beam alignment database 110 is built (e.g., a sufficient quantity of past mmWave communication scenarios and corresponding candidate beam pairs have been collected and organized in the database 110), the modification system 199 can use the data stored in the beam alignment database 110 as feedback which is used to quickly train the V2X radio 143 for mmWave communications using the beam alignment settings stored in the beam alignment database 110. For example, the ego vehicle 123 is intended to perform a mmWave communication with the remote vehicle 124, and the feedback system 109 can provide feedback data to facilitate the mmWave communication between the ego vehicle 123 and the remote vehicle 124.

For example, after the beam alignment database 110 is built, the modification system 199 of the ego vehicle 123 and the feedback system 109 of the server 106 cooperate with one another to execute one or more of the following operations:

Operation (1): The modification system 199 of the ego vehicle 123 determines that a mmWave message is desired to be exchanged by the ego vehicle 123 with the remote vehicle 124.

Operation (2): The modification system 199 of the ego vehicle 123 determines scenario data 140 describing a current driving scenario of the ego vehicle 123 with the remote vehicle 124.

Operation (3): The modification system 199 of the ego vehicle 123 requests a recommended beam alignment setting from the feedback system 109 based on the current driving scenario. This request is communicated as a beam request message 108. The beam request message 108 is an electronic wireless message that includes, for example, the scenario data as its payload and includes a request for a recommended beam alignment setting that is optimized based on the current driving scenario described by the scenario data 140.

Additionally, or alternatively, the modification system 199 of the remote vehicle 124 can also determine the scenario data 140 describing the current driving scenario with the ego vehicle 123 and sends the scenario data 140 to the server 106 via the beam request message 108.

Operation (4): The feedback system 109 of the server 106 receives the beam request message 108 as an input and determines, based on the scenario data 140 and the beam alignment database 110, an instance of feedback data 144. The feedback data 144 is digital data that describes, for example, an optimal beam alignment setting for one or more of the ego vehicle 123 and the remote vehicle 124 based on the current driving scenario and the beam alignment settings that have worked best for other vehicles in similar scenarios as described by the data included in the beam alignment database 110. For example, the feedback system 109 queries the beam alignment database 110 using the scenario data 140 and receives a response from the beam alignment database, where the response includes the recommended beam alignment setting retrieved based on the scenario data 140. The feedback system 109 transmits an electronic wireless message to the ego vehicle 123 that includes the feedback data 144 as its payload.

Operation (5): The modification system 199 of the ego vehicle 123 receives the wireless message that include the feedback data 144 describing the recommended beam alignment setting based on the current driving scenario.

Operation (6): The modification system 199 takes steps to modify the mmWave radio settings of the ego vehicle 123 (and, optionally, the remote vehicle 124 as well) based on the feedback data 144 provided by the feedback system 109 describing the recommended beam alignment setting.

Operation (7): The modification system 199 causes the V2X radio 143 of the ego vehicle 123 to exchange the mmWave message with the remote vehicle 124 using the recommended beam alignment setting.

Example benefits provided by the modification system 199 and the feedback system 109 described herein include, but are not limited to, the following: (1) learning (e.g., machine learning, deep learning, etc.) on performance of past beam pairs can be implemented, which can be used for beam alignment recommendations in different scenarios of mmWave communications; and (2) beam alignment overhead for mmWave communications is reduced. Here, the beam alignment overhead may refer to one or more of an amount of resources and an amount of time needed to perform a beam alignment. For example, by utilizing the recommended beam alignment setting received from the server 106, the modification system 199 may perform a beam alignment training with a faster speed or even the beam alignment training is no longer needed.

Example Computer System

Figure 2:
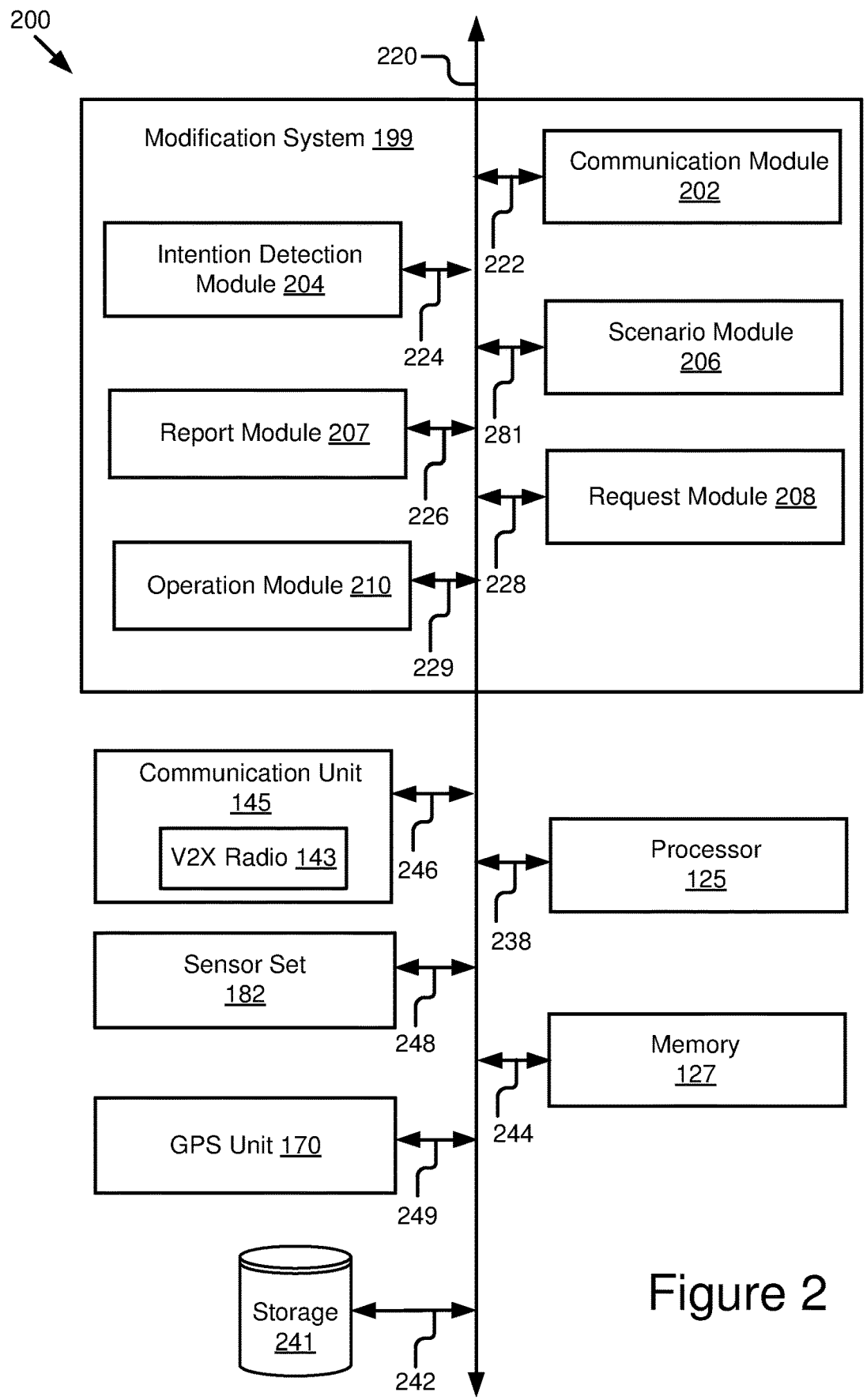
FIG. 2 is a block diagram illustrating an example computer system including a modification system according to some embodiments.

Referring now to FIG. 2, depicted is a block diagram illustrating an example computer system 200 including the modification system 199 according to some embodiments. In some embodiments, the computer system 200 may include a special-purpose computer system that is programmed to perform one or more steps of methods 300, 400 and 450 described below with reference to FIGS. 3-4B and processes 500 and 550 described below with reference to FIGS. 5A-5B.

In some embodiments, the computer system 200 may be an element of the first endpoint 101. In some embodiments, the computer system 200 may be an onboard vehicle computer of the first endpoint 101. In some embodiments, the computer system 200 may include an engine control unit, head unit or some other processor-based computing device of the first endpoint 101.

The computer system 200 may include one or more of the following elements according to some examples: the modification system 199; the processor 125; the communication unit 145; the sensor set 182; the GPS unit 170; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244.

The following elements of the computer system 200 are described above with reference to FIGS. 1A-1B, and so, those descriptions will not be repeated here: the processor 125; the communication unit 145; the sensor set 182; the GPS unit 170; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the modification system 199 includes: a communication module 202; an intention detection module 204; a scenario module 206; a report module 207; a request module 208; and an operation module 210. These components of the modification system 199 are communicatively coupled to each other via the bus 220. In some embodiments, components of the modification system 199 can be stored in a single server or device. In some other embodiments, components of the modification system 199 can be distributed and stored across multiple servers or devices. For example, some of the components of the modification system 199 may be distributed across the third endpoint 104, the second endpoint 103 and the first endpoint 101.

The communication module 202 can be software including routines for handling communications between the modification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100 or 150. For example, the communication module 202 receives or transmits, via the communication unit 145, a wireless message. The communication module 202 may send or receive any of the data or messages described above with reference to FIGS. 1A-1D via the communication unit 145.

In some embodiments, the communication module 202 receives data from components of the modification system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the modification system 199. For example, the communication module 202 may handle communications among the intention detection module 204, the scenario module 206, the report module 207, the request module 208 and the operation module 210. Any of these modules may cause the communication module 202 to communicate with the other elements of the computer system 200 or the operating environment 100 or 150 (via the communication unit 145). For example, the scenario module 206 may use the communication module 202 to communicate with the sensor set 182 and cause the sensor set 182 to record sensor data.

The intention detection module 204 can be software including routines for detecting an intention of the first endpoint 101 to exchange a mmWave message with another endpoint (e.g., the second endpoint 103 or the third endpoint 104). In some embodiments, the intention detection module 204 can be stored in the memory 127 of the computer system 200 and can be accessible and executable by the processor 125. The intention detection module 204 may be adapted for cooperation and communication with the processor 125 and other components of the computer system 200 via a signal line 224.

In some embodiments, the ADAS system 183 or the autonomous driving system 184 of the first endpoint 101 provides a command to the communication unit 145 of the first endpoint 101 to transmit a mmWave message to another endpoint (e.g., the second endpoint 103 or the third endpoint 104). Responsive to receiving the command, the intention detection module 204 determines that a mmWave message is desired to be exchanged by the first endpoint 101 with the other endpoint. The intention detection module 204 may notify the scenario module 206 of the first endpoint's intention to exchange the mmWave message, which causes the scenario module 206 to generate scenario data as described below.

The scenario module 206 can be software including routines that, when executed by the processor 125, cause the processor 125 to generate scenario data. In some embodiments, the scenario module 206 can be a set of instructions stored in the memory 127 of the computer system 200 and can be accessible and executable by the processor 125. The scenario module 206 may be adapted for cooperation and communication with the processor 125 and other components of the computer system 200 via a signal line 281.

In some embodiments, the scenario module 206 may operate one or more sensors of the sensor set 182 to generate sensor data describing the measurements of the sensor set 182. The scenario module 206 may cause the sensor data to be stored in the memory 127. Specifically, the scenario module 206 may operate one or more sensors included in the sensor set 182 to record sensor data describing measurements of a physical environment proximate to the computer system 200. The second endpoint 103, the third endpoint 104 or a combination thereof may be located in the physical environment proximate to the first endpoint 101 that includes the computer system 200.

In some embodiments, responsive to the intention detection module 204 detecting the first endpoint's intention to exchange a mmWave message with another endpoint, the scenario module 206 generates scenario data describing a scenario of one or more of the first endpoint 101 and the other endpoint based on the sensor data recorded by the sensor set 182. For example, the first endpoint 101 is the ego vehicle 123 while the other endpoint is a roadside unit, and the scenario can be a driving scenario of the ego vehicle 123 near the roadside unit. In another example, the first endpoint 101 and the other endpoint are the ego vehicle 123 and the remote vehicle 124 respectively, and the scenario can be a driving scenario involving both the ego vehicle 123 and the remote vehicle 124.

In some embodiments, the scenario data includes one or more of: location data describing a geographic location of the first endpoint 101; speed data describing a speed, an acceleration or a combination thereof of the first endpoint 101; time data describing a time when the first endpoint 101 is present at the geographic location; weather data describing one or more weather conditions at the geographic location; relative data describing one or more of a location of the other endpoint relative to the first endpoint 101, a speed of the other endpoint relative to the first endpoint 101 and an acceleration of the other endpoint relative to the first endpoint 101; and endpoint data describing one or more of a make and model of the other endpoint and a make and model of the first endpoint 101.

For example, the scenario module 206 generates location data describing a geographic location of the first endpoint 101 and time data describing a time when the first endpoint is present at the geographic location based on sensor data recorded by the GPS unit 170. The scenario module 206 generates speed data describing a speed, an acceleration, or a combination thereof of the first endpoint 101 based on sensor data recorded by an accelerometer. The scenario module 206 generates weather data describing one or more weather conditions at the geographic location based on sensor data recorded by a camera, a LIDAR sensor, a thermostat, and any other types of sensors. Furthermore, based on the sensor data recorded by the sensor set 182, the scenario module 206 may also generate: relative data describing one or more of a location of the other endpoint relative to the first endpoint 101, a speed of the other endpoint relative to the first endpoint 101 and an acceleration of the other endpoint relative to the first endpoint 101; and endpoint data describing one or more of a make and model of the other endpoint and a make and model of the first endpoint 101.

The report module 207 can be software including routines that, when executed by the processor 125, cause the processor 125 to generate a beam report message. In some embodiments, the report module 207 can be stored in the memory 127 of the computer system 200 and can be accessible and executable by the processor 125. The report module 207 may be adapted for cooperation and communication with the processor 125 and other components of the computer system 200 via a signal line 226.

In some embodiments, the report module 207 receives the scenario data describing the scenario of one or more of the first endpoint 101 and the other endpoint from the scenario module 206. The report module 207 monitors a beam alignment training for exchanging of the mmWave message between the first endpoint 101 and the other endpoint and causes the V2X radio 143 of the first endpoint 101 to record beam data describing one or more results of the beam alignment training with the other endpoint. In some embodiments, the beam data includes one or more of: a list of candidate beam pairs being trained; a received signal strength for each candidate beam pair being trained; and a data rate achieved by each candidate beam pair.

The report module 207 causes the V2X radio 143 of the first endpoint 101 to transmit the beam report message including the scenario data and the beam data to the server via a V2X network. In this case, the feedback system 109 of the server 106 can use the beam report message as an input to build the beam alignment database 110 that includes optimal beam alignment settings in different real-world scenarios as described above with reference to FIG. 1C or below with reference to FIG. 5A.

The request module 208 can be software including routines that, when executed by the processor 125, cause the processor 125 to request a recommended beam alignment setting from the server 106 based on the scenario data. In some embodiments, the request module 208 can be stored in the memory 127 of the computer system 200 and can be accessible and executable by the processor 125. The request module 208 may be adapted for cooperation and communication with the processor 125 and other components of the computer system 200 via a signal line 228.

In some embodiments, responsive to (1) the intention detection module 204 detecting the first endpoint's intention to exchange a mmWave message with another endpoint and (2) the beam alignment database 110 being already built in the server 106, the request module 208 receives scenario data from the scenario module 206 and requests a recommended beam alignment setting from the server 106 based on the scenario data. For example, the request module 208 generates and sends a beam request message to the server 106. The beam request message includes the scenario data as payload data and includes a request for the recommended beam alignment setting that is optimized for the scenario. The beam request message causes the feedback system 109 of the server 106 to query the beam alignment database 110 (which includes optimal beam alignment settings in different real-world scenarios) based on the scenario data and to generate feedback data describing the recommended beam alignment setting as a query result. The feedback system 109 of the server 106 sends the feedback data to the operation module 210.

The operation module 210 can be software including routines that, when executed by the processor 125, cause the processor 125 to modify an operation of the V2X radio 143 based on the feedback data for execution of a mmWave communication. In some embodiments, the operation module 210 can be stored in the memory 127 of the computer system 200 and can be accessible and executable by the processor 125. The operation module 210 may be adapted for cooperation and communication with the processor 125 and other components of the computer system 200 via a signal line 229.

In some embodiments, the operation module 210 receives the feedback data describing the recommended beam alignment setting from the server 106. The operation module 210 modifies an operation of the V2X radio 143 of the first endpoint 101 based on the recommended beam alignment setting to cause a beam of the V2X radio 143 of the first endpoint 101 to be aligned with a beam of the V2X radio 143 of the other endpoint. As a result, the V2X radio 143 of the first endpoint 101 exchanges the mmWave message with the V2X radio 143 of the other endpoint using the recommended beam alignment setting.

In some embodiments, the operation module 210 modifies both (1) an operation of the V2X radio 143 of the first endpoint 101 and (2) an operation of the V2X radio 143 of the other endpoint based on the recommended beam alignment setting to cause the beam of the V2X radio 143 of the first endpoint 101 to be aligned with the beam of the V2X radio 143 of the other endpoint. As a result, the mmWave message is exchanged between the first endpoint 101 and the other endpoint using the recommended beam alignment setting.

For example, the recommended beam alignment setting includes a first recommended beam lobe for the first endpoint and a second recommended beam lobe for the other endpoint, and the V2X radio 143 of the first endpoint 101 and the V2X radio 143 of the other endpoint are modified to use the first recommended beam lobe and the second recommended beam lobe respectively to exchange the mmWave message (e.g., the operation module 210 modifies an operation of the V2X radio 143 of the first endpoint 101 so that the V2X radio 143 of the first endpoint 101 uses the first recommended beam lobe for the exchanging of the mmWave message, and the operation module 210 modifies an operation of the V2X radio 143 of the other endpoint so that the V2X radio 143 of the other endpoint uses the second recommended beam lobe for the exchanging of the mmWave message).

In some embodiments, the recommended beam alignment setting provides an improved mmWave communication performance for one or more of the V2X radio 143 of the first endpoint 101 and the V2X radio 143 of the other endpoint, where the improved mmWave communication perform includes a reduction of beam alignment overhead (e.g., a reduced beam alignment training time, a reduced amount of computing resources needed to perform the beam alignment training, etc.).

In some embodiments, the operation module 210 generates mmWave performance data related to the exchanging of the mmWave message that is performed using the recommended beam alignment setting. For example, the mmWave performance data includes one or more of an achieved data rate, a received signal strength, etc. The operation module 210 uploads the mmWave performance data to the server 106.

In some embodiments, the operation module 210 may monitor the mmWave performance of the exchanging of the mmWave message. If the mmWave performance drops below a threshold (e.g., an achieved data rate is below a data rate threshold), the operation module 210 may instruct: (1) the scenario module 206 to update the scenario data; and (2) the request module 208 to request for a new recommended beam alignment setting based on the updated scenario data. In this case, the operation module 210 may modify one or more of (1) an operation of the V2X radio 143 of the first endpoint 101 and (2) an operation of the V2X radio 143 of the other endpoint again based on the new recommended beam alignment setting.

In some embodiments, if the application of the recommended beam alignment setting fails (e.g., the mmWave performance drops below a threshold when using the recommended beam alignment setting), the operation module 210 may use new beam pairs to train one or more of the V2X radio 143 of the first endpoint 101 and the V2X radio 143 of the other endpoint. The operation module 210 may cause the report module 207 to report the related beam data and scenario data to the server 106.

Example Processes

Figure 3:
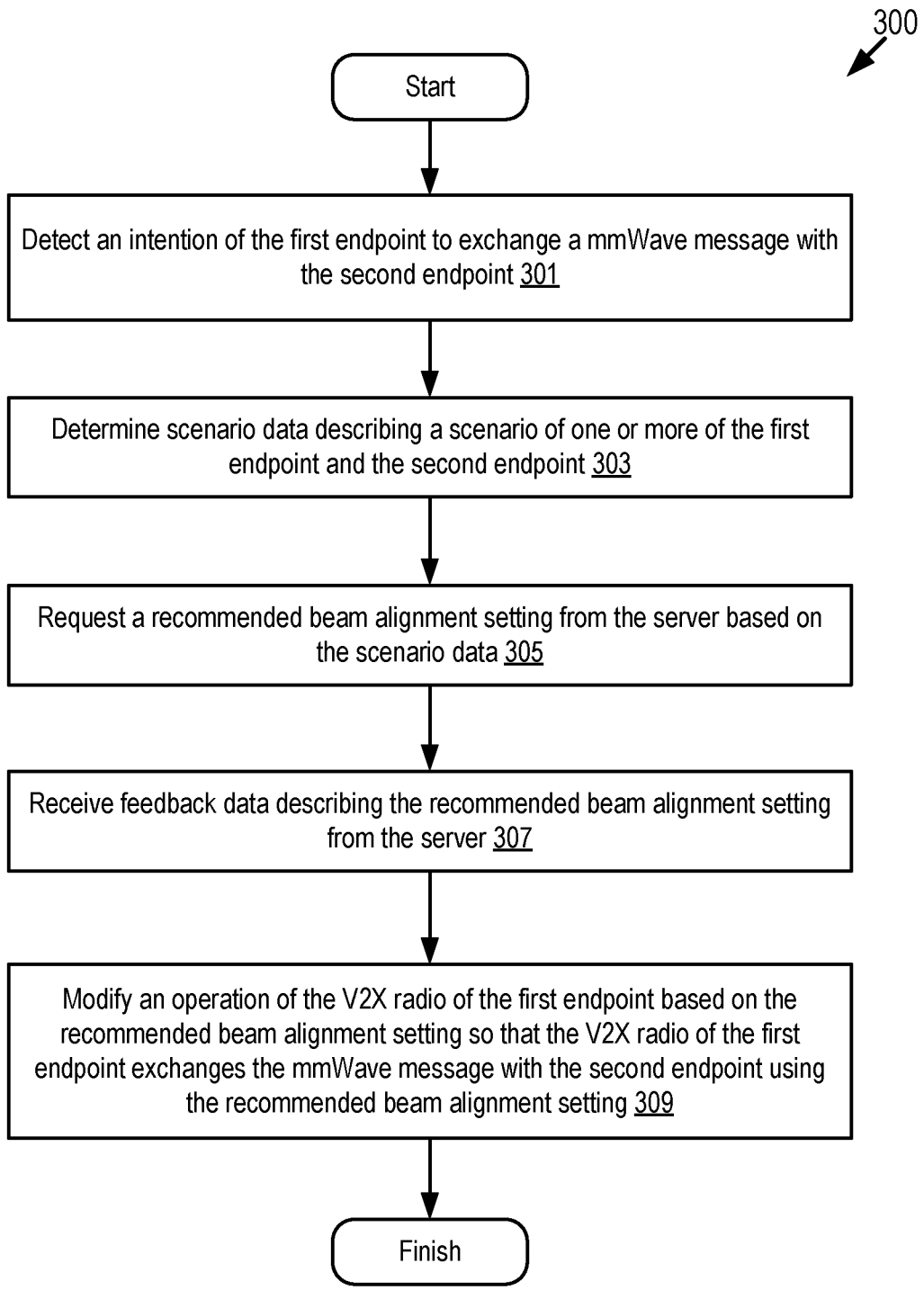
FIG. 3 depicts a method for modifying a V2X radio of a first endpoint based on beam alignment feedback data according to some embodiments.

Referring now to FIG. 3, depicted is a flowchart of an example method 300 for modifying the V2X radio 143 of the first endpoint 101 based on beam alignment feedback data according to some embodiments. The steps of the method 300 are executable in any order, and not necessarily the order depicted in FIG. 3. The method 300 may be executed by the first endpoint 101.

At step 301, the intention detection module 204 detects an intention of the first endpoint 101 to exchange a mmWave message with another endpoint. By way of examples, here assume that the other endpoint is the second endpoint 103. Of course, the other endpoint can be the third endpoint 104 or any other endpoint.

At step 303, the scenario module 206 determines scenario data describing a scenario of one or more of the first endpoint 101 and the second endpoint 103.

At step 305, the request module 208 requests a recommended beam alignment setting from the server 106 based on the scenario data.

At step 307, the operation module 210 receives feedback data describing the recommended beam alignment setting from the server 106.

At step 309, the operation module 210 modifies an operation of the V2X radio 143 of the first endpoint 101 based on the recommended beam alignment setting so that the V2X radio 143 of the first endpoint 101 exchanges the mmWave message with the second endpoint 103 using the recommended beam alignment setting.

Figure 4A:
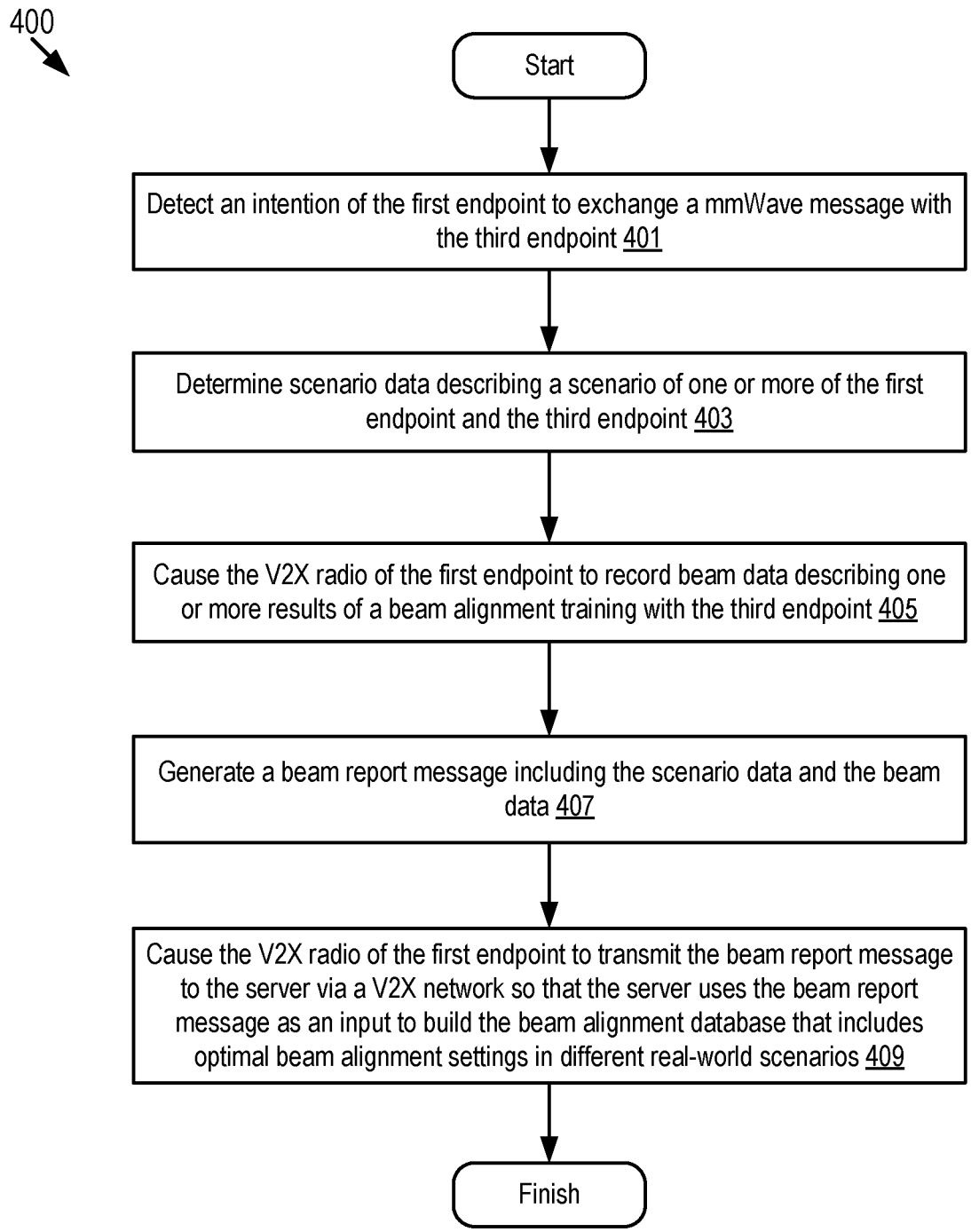
FIG. 4A depicts a method for creating a beam report message by a first endpoint according to some embodiments.

FIG. 4A depicts a method 400 for creating a beam report message according to some embodiments. The steps of the method 400 are executable in any order, and not necessarily the order depicted in FIG. 4A. The method 400 may be executed by the first endpoint 101.

At step 401, the intention detection module 204 detects an intention of the first endpoint 101 to exchange a mmWave message with another endpoint. By way of examples, here assume that the other endpoint is the third endpoint 104. Of course, the other endpoint can be the second endpoint 103 or any other endpoint.

At step 403, the scenario module 206 determines scenario data describing a scenario of one or more of the first endpoint 101 and the third endpoint 104.

At step 405, the report module 207 causes the V2X radio 143 of the first endpoint 101 to record beam data describing one or more results of a beam alignment training with the third endpoint 104.

At step 407, the report module 207 generates a beam report message including the scenario data and the beam data.

At step 409, the report module 207 causes the V2X radio 143 of the first endpoint 101 to transmit the beam report message to the server 106 via a V2X network so that the server 106 uses the beam report message as an input to build the beam alignment database 110 that includes optimal beam alignment settings in different real-world scenarios.

Figure 4B:
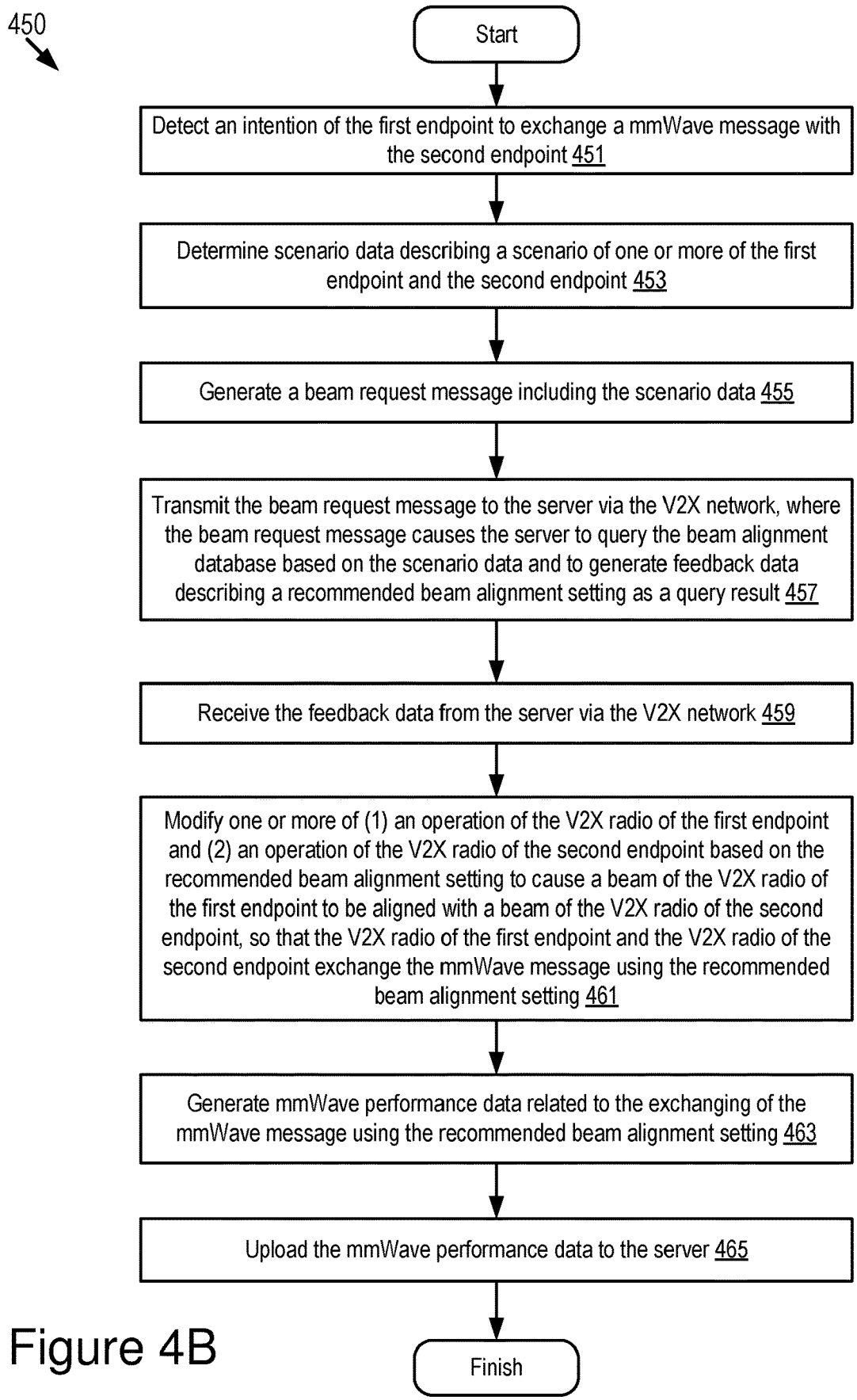
FIG. 4B depicts another method for modifying a V2X radio of a first endpoint based on beam alignment feedback data according to some embodiments.

FIG. 4B depicts another method 450 for modifying the V2X radio 143 of the first endpoint 101 based on beam alignment feedback data according to some embodiments. The steps of the method 450 are executable in any order, and not necessarily the order depicted in FIG. 4B. The method 450 may be executed by the first endpoint 101.

At step 451, the intention detection module 204 detects an intention of the first endpoint 101 to exchange a mmWave message with another endpoint. By way of examples, here assume that the other endpoint is the second endpoint 103. Of course, the other endpoint can be the third endpoint 104 or any other endpoint.

At step 453, the scenario module 206 determines scenario data describing a scenario of one or more of the first endpoint 101 and the second endpoint 103.

At step 455, the report module 207 generates a beam request message including the scenario data.

At step 457, the report module 207 transmits the beam request message to the server 106 via the V2X network, where the beam request message causes the server 106 to query the beam alignment database 110 based on the scenario data and to generate feedback data describing a recommended beam alignment setting as a query result.

At step 459, the operation module 210 receives the feedback data from the server 106 via the V2X network.

At step 461, the operation module 210 modifies one or more of (1) an operation of the V2X radio 143 of the first endpoint 101 and (2) an operation of the V2X radio 143 of the second endpoint 103 based on the recommended beam alignment setting to cause a beam of the V2X radio 143 of the first endpoint 101 to be aligned with a beam of the V2X radio 143 of the second endpoint 103, so that the V2X radio 143 of the first endpoint 101 and the V2X radio 143 of the second endpoint 103 exchange the mmWave message using the recommended beam alignment setting.

At step 463, the operation module 210 generates mmWave performance data related to the exchanging of the mmWave message that is performed using the recommended beam alignment setting.

At step 465, the operation module 210 uploads the mmWave performance data to the server 106.

Figure 5A:
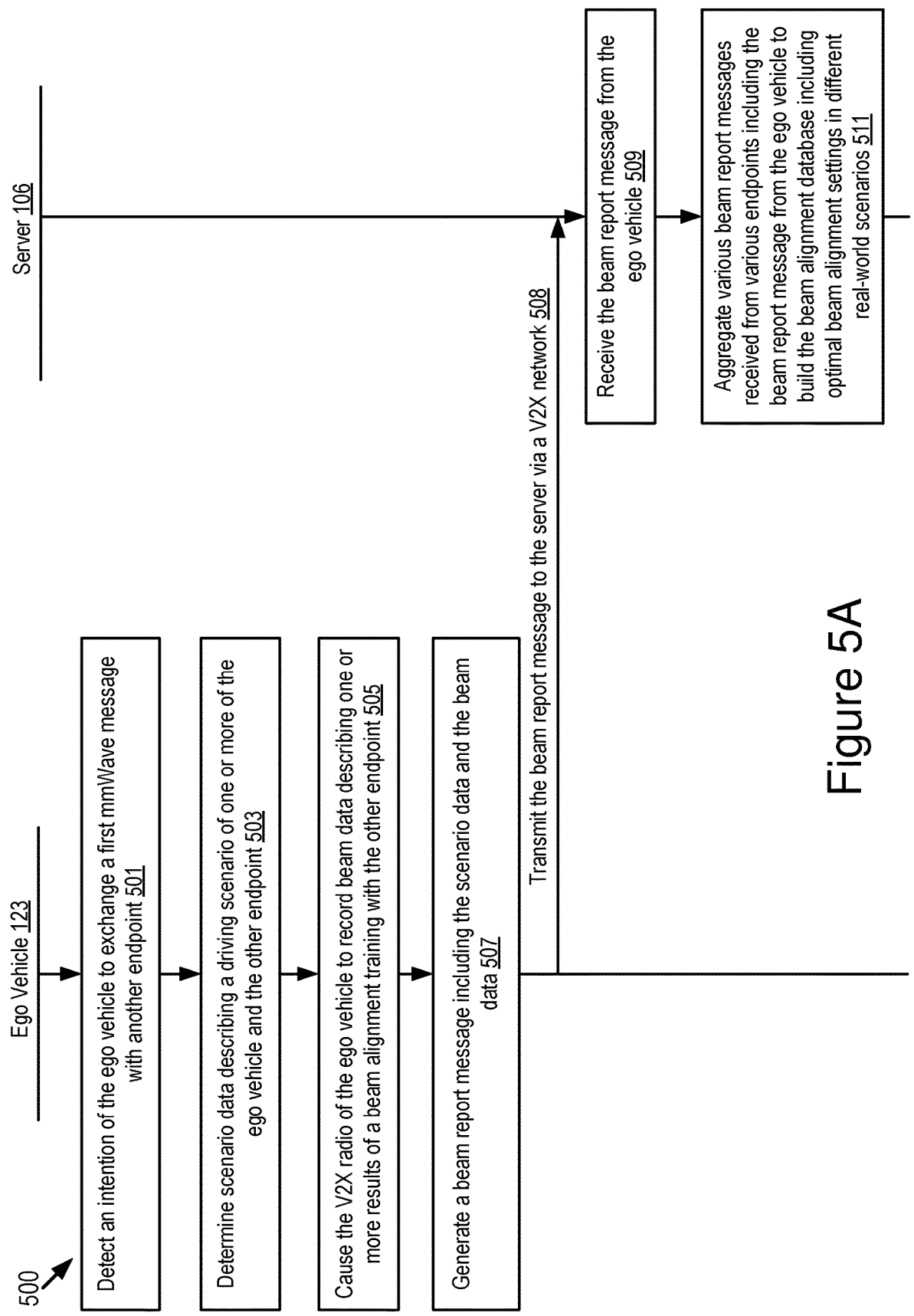
FIG. 5A depicts an example process for creating a beam alignment database according to some embodiments.

FIG. 5A depicts an example process 500 for creating the beam alignment database 110 according to some embodiments. The steps of the process 500 are executable in any order, and not necessarily the order depicted in FIG. 5A.

At step 501, the intention detection module 204 of the ego vehicle 123 detects an intention of the ego vehicle 123 to exchange a mmWave message with another endpoint. For example, the other endpoint can be the remote vehicle 124 or any other endpoint.

At step 503, the scenario module 206 of the ego vehicle 123 determines scenario data describing a driving scenario of one or more of the ego vehicle 123 and the other endpoint.

At step 505, the report module 207 of the ego vehicle 123 causes the V2X radio 143 of the ego vehicle 123 to record beam data describing one or more results of a beam alignment training with the other endpoint.

At step 507, the report module 207 of the ego vehicle 123 generates a beam report message including the scenario data and the beam data.

At step 508, the report module 207 of the ego vehicle 123 transmits the beam report message to the server 106 via a V2X network using the V2X radio 143 of the ego vehicle 123.

At step 509, the feedback system 109 of the server 106 receives the beam report message from the ego vehicle 123.

At step 511, the feedback system 109 of the server 106 aggregates various beam report messages received from various endpoints including the beam report message from the ego vehicle 123 to build the beam alignment database 110, where the beam alignment database 110 includes optimal beam alignment settings in different real-world scenarios.

Figure 5B:
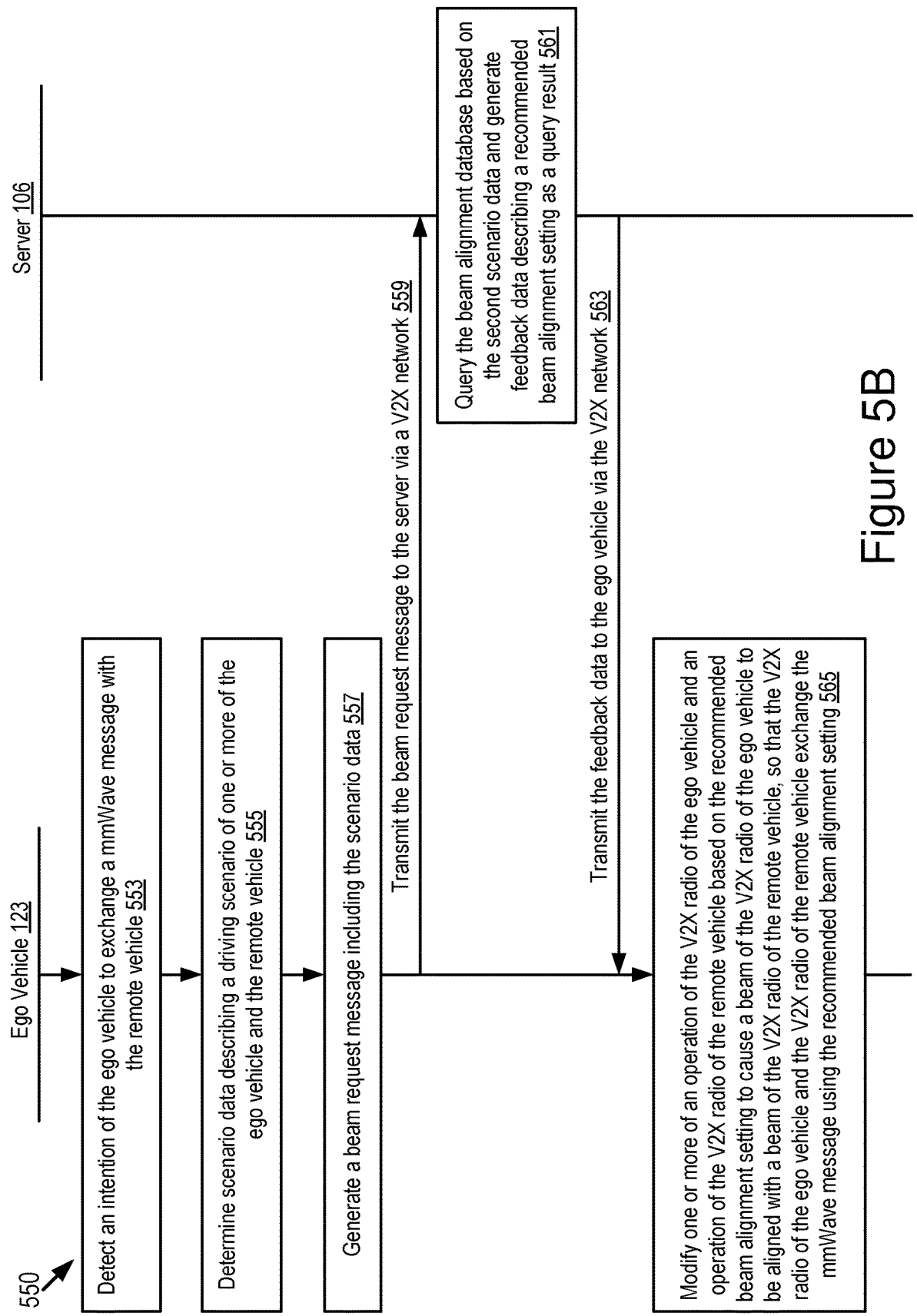
FIG. 5B depicts an example process for modifying a V2X radio based on beam alignment feedback data according to some embodiments.

FIG. 5B depicts an example process 550 for modifying the V2X radio 143 based on beam alignment feedback data according to some embodiments. The steps of the process 550 are executable in any order, and not necessarily the order depicted in FIG. 5B.

At step 553, the intention detection module 204 of the ego vehicle 123 detects an intention of the ego vehicle 123 to exchange a mmWave message with another endpoint. By way of examples, here assume that the other endpoint is the remote vehicle 124. Of course, the other endpoint can be any other type of endpoint such as a roadside unit, a base station, etc.

At step 555, the scenario module 206 of the ego vehicle 123 determines scenario data describing a driving scenario of one or more of the ego vehicle 123 and the remote vehicle 124.

At step 557, the report module 207 of the ego vehicle 123 generates a beam request message including the scenario data.

At step 559, the report module 207 of the ego vehicle 123 transmits the beam request message to the server 106 via the V2X network.

At step 561, the feedback system 109 of the server 106 queries the beam alignment database 110 based on the scenario data and generates feedback data describing a recommended beam alignment setting as a query result.

At step 563, the feedback system 109 of the server 106 sends the feedback data to the ego vehicle 123 via the V2X network.

At step 565, the operation module 210 of the ego vehicle 123 modifies one or more of (1) an operation of the V2X radio 143 of the ego vehicle 123 and (2) an operation of the V2X radio 143 of the remote vehicle 124 based on the recommended beam alignment setting to cause a beam of the V2X radio 143 of the ego vehicle 123 to be aligned with a beam of the V2X radio 143 of the remote vehicle 124, so that the V2X radio 143 of the ego vehicle 123 and the V2X radio 143 of the remote vehicle 124 exchange the mmWave message using the recommended beam alignment setting.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a first endpoint, comprising:
   detecting an intention of the first endpoint to exchange a first millimeter wave (mmWave) message with a second endpoint;
   determining first scenario data describing a first scenario of one or more of the first endpoint and the second endpoint;
   requesting a recommended beam alignment setting from a connected computing device based on the first scenario data;
   receiving feedback data describing the recommended beam alignment setting from the connected computing device; and
   modifying an operation of a vehicle-to-everything (V2X) radio of the first endpoint based on the recommended beam alignment setting so that the V2X radio of the first endpoint exchanges the first mmWave message with the second endpoint using the recommended beam alignment setting.

2. The method of claim 1, wherein requesting the recommended beam alignment setting from the connected computing device based on the first scenario data comprises:
   sending a beam request message to the connected computing device,
   wherein the beam request message includes the first scenario data as payload data and includes a request for the recommended beam alignment setting that is optimized for the first scenario, and
   wherein the beam request message causes the connected computing device to query a beam alignment database that includes optimal beam alignment settings in different real-world scenarios based on the first scenario data and to generate feedback data describing the recommended beam alignment setting as a query result.

3. The method of claim 1, wherein the first scenario data includes one or more of: location data describing a geographic location of the first endpoint; speed data describing a speed, an acceleration or a combination thereof of the first endpoint; time data describing a time when the first endpoint is present at the geographic location; weather data describing one or more weather conditions at the geographic location; relative data describing one or more of a location of the second endpoint relative to the first endpoint, a speed of the second endpoint relative to the first endpoint and an acceleration of the second endpoint relative to the first endpoint; and endpoint data describing one or more of a make and model of the second endpoint and a make and model of the first endpoint.

4. The method of claim 1, wherein the recommended beam alignment setting provides an improved mmWave communication performance for the V2X radio of the first endpoint that includes a reduction of beam alignment overhead.

5. The method of claim 1, further comprising:
   modifying an operation of a V2X radio of the second endpoint based on the recommended beam alignment setting to cause a beam of the V2X radio of the first endpoint to be aligned with a beam of the V2X radio of the second endpoint so that the first mmWave message is exchanged between the first endpoint and the second endpoint using the recommended beam alignment setting.

6. The method of claim 5, wherein the recommended beam alignment setting includes a first recommended beam lobe for the first endpoint and a second recommended beam lobe for the second endpoint, and the V2X radio of the first endpoint and the V2X radio of the second endpoint are modified to use the first recommended beam lobe and the second recommended beam lobe respectively to exchange the first mmWave message.

7. The method of claim 1, wherein prior to detecting the intention of the first endpoint to exchange the first mmWave message with the second endpoint, the method further comprises:

detecting an intention of the first endpoint to exchange a second mmWave message with a third endpoint;

generating a beam report message related to exchanging of the second mmWave message; and sending the beam report message to the connected computing device so that the connected computing device uses the beam report message as an input to build a beam alignment database that includes optimal beam alignment settings in different real-world scenarios.

8. The method of claim 7, wherein generating the beam report message related to exchanging of the second mmWave message comprises:

determining second scenario data describing a second scenario of one or more of the first endpoint and the third endpoint;

causing the V2X radio of the first endpoint to record beam data describing one or more results of a beam alignment training with the third endpoint; and causing the V2X radio of the first endpoint to transmit the beam report message including the second scenario data and the beam data to the connected computing device via a V2X network.

9. The method of claim 8, wherein the second scenario data includes one or more of: location data describing a geographic location of the first endpoint; speed data describing a speed, an acceleration or a combination thereof of the first endpoint; time data describing a time when the first endpoint is present at the geographic location; weather data describing one or more weather conditions at the geographic location; relative data describing one or more of a location of the third endpoint relative to the first endpoint, a speed of the third endpoint relative to the first endpoint and an acceleration of the third endpoint relative to the first endpoint; and endpoint data describing one or more of a make and model of the third endpoint and a make and model of the first endpoint.

10. The method of claim 8, wherein the beam data includes one or more of: a list of candidate beam pairs being trained; a received signal strength for each candidate beam pair being trained; and a data rate achieved by each candidate beam pair.

11. The method of claim 7, wherein the third endpoint is identical to the second endpoint.

12. The method of claim 7, wherein the third endpoint is different from the second endpoint.

13. The method of claim 1, wherein the first endpoint is an ego vehicle and the second endpoint is a remote vehicle.

14. A system comprising:

an onboard vehicle computer system of a first endpoint including a non-transitory memory storing computer code which, when executed by the onboard vehicle computer system, causes the onboard vehicle computer system to:

detect an intention of the first endpoint to exchange a first millimeter wave (mmWave) message with a second endpoint;

determine first scenario data describing a first scenario of one or more of the first endpoint and the second endpoint;

request a recommended beam alignment setting from a connected computing device based on the first scenario data;

receive feedback data describing the recommended beam alignment setting from the connected computing device; and modify an operation of a vehicle-to-everything (V2X) radio of the first endpoint based on the recommended beam alignment setting so that the V2X radio of the first endpoint exchanges the first mmWave message with the second endpoint using the recommended beam alignment setting.

15. The system of claim 14, wherein the computer code, when executed by the onboard vehicle computer system, causes the onboard vehicle computer system to request the recommended beam alignment setting from the connected computing device based on the first scenario data at least by:

sending a beam request message to the connected computing device, wherein the beam request message includes the first scenario data as payload data and includes a request for the recommended beam alignment setting that is optimized for the first scenario, and wherein the beam request message causes the connected computing device to query a beam alignment database that includes optimal beam alignment settings in different real-world scenarios based on the first scenario data and to generate feedback data describing the recommended beam alignment setting as a query result.

16. The system of claim 14, wherein the computer code, when executed by the onboard vehicle computer system, causes the onboard vehicle computer system further to:

modify an operation of a V2X radio of the second endpoint based on the recommended beam alignment setting to cause a beam of the V2X radio of the first endpoint to be aligned with a beam of the V2X radio of the second endpoint so that the first mmWave message is exchanged between the first endpoint and the second endpoint using the recommended beam alignment setting.

17. The system of claim 14, wherein prior to detecting the intention of the first endpoint to exchange the first mmWave message with the second endpoint, the computer code, when executed by the onboard vehicle computer system, causes the onboard vehicle computer system to:

detect an intention of the first endpoint to exchange a second mmWave message with a third endpoint;

generate a beam report message related to exchanging of the second mmWave message; and send the beam report message to the connected computing device so that the connected computing device uses the beam report message as an input to build a beam alignment database that includes optimal beam alignment settings in different real-world scenarios.

18. A computer program product comprising a non-transitory memory of an onboard vehicle computer system of a first endpoint storing computer-executable code that, when executed by a processor, causes the processor to:

detect an intention of the first endpoint to exchange a first millimeter wave (mmWave) message with a second endpoint;

determine first scenario data describing a first scenario of one or more of the first endpoint and the second endpoint;

request a recommended beam alignment setting from a connected computing device based on the first scenario data;

receive feedback data describing the recommended beam alignment setting from the connected computing device; and modify an operation of a vehicle-to-everything (V2X) radio of the first endpoint based on the recommended beam alignment setting so that the V2X radio of the first endpoint exchanges the first mmWave message with the second endpoint using the recommended beam alignment setting.

19. The computer program product of claim 18, wherein the computer-executable code, when executed by the processor, causes the processor further to:
modify an operation of a V2X radio of the second endpoint based on the recommended beam alignment setting to cause a beam of the V2X radio of the first endpoint to be aligned with a beam of the V2X radio of the second endpoint so that the first mmWave message is exchanged between the first endpoint and the second endpoint using the recommended beam alignment setting.

20. The computer program product of claim 18, wherein prior to detecting the intention of the first endpoint to exchange the first mmWave message with the second endpoint, the computer-executable code, when executed by the processor, causes the processor further to:
detect an intention of the first endpoint to exchange a second mmWave message with a third endpoint;
generate a beam report message related to exchanging of the second mmWave message; and
send the beam report message to the connected computing device so that the connected computing device uses the beam report message as an input to build a beam alignment database that includes optimal beam alignment settings in different real-world scenarios.

* * * * *